United States Patent
Wright et al.

(10) Patent No.: US 11,120,437 B2
(45) Date of Patent: Sep. 14, 2021

(54) REGISTRY AND AUTOMATED MANAGEMENT METHOD FOR BLOCKCHAIN-ENFORCED SMART CONTRACTS

(71) Applicant: nChain Holdings Limited, St. John's (AG)

(72) Inventors: Craig Steven Wright, London (GB); Stephane Savanah, London (GB)

(73) Assignee: nChain Holdings Limited, St. Johns (AG)

( * ) Notice: Subject to any disclaimer, the term of this patent is extended or adjusted under 35 U.S.C. 154(b) by 0 days.

(21) Appl. No.: 16/078,605

(22) PCT Filed: Feb. 16, 2017

(86) PCT No.: PCT/IB2017/050865
§ 371 (c)(1),
(2) Date: Aug. 21, 2018

(87) PCT Pub. No.: WO2017/145019
PCT Pub. Date: Aug. 31, 2017

(65) Prior Publication Data
US 2019/0057382 A1  Feb. 21, 2019

(30) Foreign Application Priority Data

Feb. 23, 2016 (GB) .................................. 1603114.8
Feb. 23, 2016 (GB) .................................. 1603117.1
(Continued)

(51) Int. Cl.
*G06Q 20/38* (2012.01)
*G06Q 20/36* (2012.01)
(Continued)

(52) U.S. Cl.
CPC ......... *G06Q 20/3829* (2013.01); *G06Q 20/02* (2013.01); *G06Q 20/3678* (2013.01);
(Continued)

(58) Field of Classification Search
CPC .............. G06Q 20/3829; G06Q 20/02; G06Q 20/3678; G06Q 20/3827; H04L 9/0637; H04L 9/321; H04L 9/3247
See application file for complete search history.

(56) References Cited

U.S. PATENT DOCUMENTS 5,600,725 A   2/1997  Rueppel et al.
5,761,305 A   6/1998  Vanstone et al.
(Continued)

FOREIGN PATENT DOCUMENTS

AU   2016100059 A4   3/2016
CA      2867765 A1   4/2016
(Continued)

OTHER PUBLICATIONS

Jeff Herbert et al., A Novel Method for Decentralised Peer-to-Peer Software License Validation Using Cryptocurrency Blockchain Technology, Jan. 27-30, 2015, Proceedings of the 38th Australasian Computer Science Conference (ACSC 2015) Sydney Australia (Year: 2015).*

(Continued)

*Primary Examiner* — Neha Patel
*Assistant Examiner* — Chunling Ding
(74) *Attorney, Agent, or Firm* — Davis Wright Tremaine LLP

(57) ABSTRACT

The invention relates to the fields of tokenisation, blockchain and smart contract technologies. It provides a technical arrangement which simplifies the automated management of contracts. The invention comprises a method and system which use a computer-based repository for storage of (Continued)

the contract. The contract is then represented by a transaction on the blockchain. Metadata within the transaction's script includes a hash of the contract and a means of identifying its location within the repository. The transaction also includes an unspent output (UTXO) which indicates its status as an open (ie not terminated) contract. The contract is terminated by spending the output at a later point in time, for example, using n Lock Time+Check Lock Time Verify (CLTV). By combining this concept with other techniques and computing components, the invention can provide a powerful mechanism for implementing various tasks such as renewing or rolling over the contract, or dividing it into sub-contracts or conditions. Furthermore, as the status and existence of the contract is evidence via the blockchain, this provides a permanent, publicly visible and non-alterable record of the contract.

10 Claims, 26 Drawing Sheets

(30) Foreign Application Priority Data

| Feb. 23, 2016 | (GB) | .................................. | 1603123.9 |
| Feb. 23, 2016 | (GB) | .................................. | 1603125.4 |
| Apr. 1, 2016 | (GB) | .................................. | 1605571.7 |
| Nov. 15, 2016 | (GB) | .................................. | 1619301.3 |

(51) Int. Cl.
*H04L 9/06* (2006.01)
*H04L 9/08* (2006.01)
*H04L 9/30* (2006.01)
*H04L 9/32* (2006.01)
*G06Q 20/02* (2012.01)

(52) U.S. Cl.
CPC ....... *G06Q 20/389* (2013.01); *G06Q 20/3827* (2013.01); *H04L 9/0637* (2013.01); *H04L 9/0836* (2013.01); *H04L 9/0891* (2013.01); *H04L 9/3066* (2013.01); *H04L 9/321* (2013.01); *H04L 9/3236* (2013.01); *H04L 9/3242* (2013.01); *H04L 9/3247* (2013.01); *G06Q 2220/00* (2013.01); *G06Q 2220/12* (2013.01); *H04L 2209/38* (2013.01); *H04L 2209/56* (2013.01)

(56) References Cited

U.S. PATENT DOCUMENTS

| 5,889,865 | A | 3/1999 | Vanstone et al. |
| 5,896,455 | A | 4/1999 | Vanstone et al. |
| 5,933,504 | A | 8/1999 | Vanstone et al. |
| 6,061,449 | A | 5/2000 | Candelore et al. |
| 6,078,667 | A | 6/2000 | Johnson |
| 6,122,736 | A | 9/2000 | Vanstone et al. |
| 6,141,420 | A | 10/2000 | Vanstone et al. |
| 6,618,483 | B1 | 9/2003 | Vanstone et al. |
| 6,704,870 | B2 | 3/2004 | Vanstone et al. |
| 6,785,813 | B1 | 8/2004 | Vanstone et al. |
| 6,792,530 | B1 | 9/2004 | Qu et al. |
| 7,006,633 | B1 | 2/2006 | Reece |
| 7,095,851 | B1 | 8/2006 | Scheidt |
| 8,522,011 | B2 | 8/2013 | Spalka et al. |
| 8,855,318 | B1 | 10/2014 | Patnala et al. |
| 9,209,980 | B2 | 12/2015 | Bowman et al. |
| 9,258,130 | B2 | 2/2016 | Hwang et al. |
| 9,298,806 | B1 | 3/2016 | Vessenes et al. |
| 10,050,779 | B2 | 8/2018 | Alness et al. |
| 10,068,228 | B1 | 9/2018 | Winklevoss et al. |
| 10,510,053 | B2 | 12/2019 | Armstrong |
| 10,659,223 | B2 | 5/2020 | Wright et al. |
| 10,719,816 | B1 | 7/2020 | Kurani |
| 2001/0050990 | A1 | 12/2001 | Sudia |
| 2002/0112171 | A1 | 8/2002 | Ginter et al. |
| 2003/0046202 | A1 | 3/2003 | Knapp |
| 2004/0049687 | A1 | 3/2004 | Orsini et al. |
| 2004/0193890 | A1 | 9/2004 | Girault |
| 2005/0071283 | A1 | 3/2005 | Randle et al. |
| 2006/0023887 | A1 | 2/2006 | Agrawal et al. |
| 2006/0153368 | A1 | 7/2006 | Beeson |
| 2006/0156013 | A1 | 7/2006 | Beeson |
| 2006/0161485 | A1 | 7/2006 | Meldahl |
| 2006/0179319 | A1 | 8/2006 | Krawczyk |
| 2007/0055880 | A1 | 3/2007 | Lauter et al. |
| 2007/0192842 | A1 | 8/2007 | Beaulieu et al. |
| 2007/0265978 | A1* | 11/2007 | Kahn ..................... G06Q 30/04 |
| | | | 705/59 |
| 2007/0276836 | A1 | 11/2007 | Chatterjee et al. |
| 2008/0082817 | A1 | 4/2008 | Takahashi et al. |
| 2008/0137857 | A1 | 6/2008 | Bellare et al. |
| 2008/0144836 | A1 | 6/2008 | Sanders et al. |
| 2008/0288773 | A1 | 11/2008 | Nguyen et al. |
| 2009/0048979 | A1 | 2/2009 | Al-Herz et al. |
| 2009/0161876 | A1 | 6/2009 | Sherkin |
| 2010/0023771 | A1 | 1/2010 | Struik |
| 2010/0131755 | A1 | 5/2010 | Zhu et al. |
| 2010/0134848 | A1 | 6/2010 | Lynggaard et al. |
| 2010/0150341 | A1 | 6/2010 | Dodgson et al. |
| 2010/0172501 | A1 | 7/2010 | Tian et al. |
| 2010/0199095 | A1 | 8/2010 | Ho |
| 2010/0228973 | A1 | 9/2010 | Dancer et al. |
| 2011/0022854 | A1 | 1/2011 | Macchetti et al. |
| 2011/0202773 | A1 | 8/2011 | Ghouti et al. |
| 2011/0307698 | A1 | 12/2011 | Vanstone |
| 2011/0311051 | A1 | 12/2011 | Resch et al. |
| 2012/0011362 | A1 | 1/2012 | Lambert |
| 2012/0039474 | A1 | 2/2012 | Ho |
| 2012/0100833 | A1 | 4/2012 | Gao |
| 2012/0284794 | A1 | 11/2012 | Trent et al. |
| 2012/0290830 | A1 | 11/2012 | Resch et al. |
| 2012/0331287 | A1 | 12/2012 | Bowman et al. |
| 2013/0051552 | A1 | 2/2013 | Handschuh et al. |
| 2013/0061049 | A1 | 3/2013 | Irvine |
| 2013/0077783 | A1 | 3/2013 | Anshel et al. |
| 2013/0177157 | A1 | 7/2013 | Li et al. |
| 2013/0191632 | A1 | 7/2013 | Spector et al. |
| 2013/0304642 | A1 | 11/2013 | Campos |
| 2014/0012751 | A1 | 1/2014 | Kuhn et al. |
| 2014/0082358 | A1 | 3/2014 | Nakhjiri et al. |
| 2014/0129844 | A1 | 5/2014 | Johnson et al. |
| 2014/0223580 | A1 | 8/2014 | Neivanov et al. |
| 2014/0250006 | A1 | 9/2014 | Makhotin et al. |
| 2015/0066748 | A1 | 3/2015 | Winslow et al. |
| 2015/0086020 | A1 | 3/2015 | Harjula et al. |
| 2015/0120567 | A1 | 4/2015 | Van Rooyen et al. |
| 2015/0154562 | A1 | 6/2015 | Emmerson |
| 2015/0188698 | A1 | 7/2015 | Tsai |
| 2015/0188700 | A1 | 7/2015 | Ben Saied et al. |
| 2015/0205929 | A1 | 7/2015 | Brama |
| 2015/0206106 | A1* | 7/2015 | Yago ................. G06Q 20/0655 |
| | | | 705/68 |
| 2015/0213433 | A1 | 7/2015 | Khan |
| 2015/0244690 | A1 | 8/2015 | Mossbarger |
| 2015/0256347 | A1 | 9/2015 | Tseng et al. |
| 2015/0262140 | A1 | 9/2015 | Armstrong |
| 2015/0269570 | A1 | 9/2015 | Phan et al. |
| 2015/0294425 | A1 | 10/2015 | Benson |
| 2015/0302401 | A1 | 10/2015 | Metral |
| 2015/0304302 | A1 | 10/2015 | Zhang |
| 2015/0310497 | A1 | 10/2015 | Valin et al. |
| 2015/0324764 | A1 | 11/2015 | Van Rooyen et al. |
| 2015/0324789 | A1 | 11/2015 | Dvorak et al. |
| 2015/0332224 | A1 | 11/2015 | Melika et al. |
| 2015/0348017 | A1 | 12/2015 | Allmen |
| 2015/0350171 | A1 | 12/2015 | Brumley |
| 2015/0356523 | A1 | 12/2015 | Madden |
| 2015/0363768 | A1 | 12/2015 | Melika et al. |
| 2015/0363770 | A1 | 12/2015 | Ronca et al. |
| 2015/0363773 | A1 | 12/2015 | Ronca et al. |

(56) References Cited

U.S. PATENT DOCUMENTS

| | | |
|---|---|---|
| 2015/0363777 A1 | 12/2015 | Ronca et al. |
| 2016/0027229 A1 | 1/2016 | Spanos et al. |
| 2016/0028552 A1 | 1/2016 | Spanos et al. |
| 2016/0071108 A1 | 3/2016 | Caldera et al. |
| 2016/0085955 A1 | 3/2016 | Lerner |
| 2016/0086175 A1 | 3/2016 | Finlow-Bates et al. |
| 2016/0092988 A1 | 3/2016 | Letourneau |
| 2016/0098723 A1 | 4/2016 | Feeney |
| 2016/0140335 A1 | 5/2016 | Proulx et al. |
| 2016/0149878 A1 | 5/2016 | Pogorelik et al. |
| 2016/0162897 A1 | 6/2016 | Feeney |
| 2016/0203522 A1 | 7/2016 | Shiffert et al. |
| 2016/0203572 A1* | 7/2016 | McConaghy .......... G06Q 20/10 705/58 |
| 2016/0234026 A1 | 8/2016 | Wilkins et al. |
| 2016/0260171 A1 | 9/2016 | Ford et al. |
| 2016/0261408 A1 | 9/2016 | Peddada et al. |
| 2016/0261565 A1 | 9/2016 | Lorenz et al. |
| 2016/0261690 A1 | 9/2016 | Ford |
| 2016/0269182 A1 | 9/2016 | Sriram et al. |
| 2016/0283941 A1 | 9/2016 | Andrade |
| 2016/0292672 A1 | 10/2016 | Fay et al. |
| 2016/0294562 A1 | 10/2016 | Oberheide et al. |
| 2016/0321434 A1 | 11/2016 | McCoy et al. |
| 2016/0335924 A1 | 11/2016 | Ikarashi et al. |
| 2016/0342977 A1 | 11/2016 | Lam |
| 2016/0342994 A1 | 11/2016 | Davis |
| 2016/0350749 A1 | 12/2016 | Wilkins et al. |
| 2016/0352518 A1 | 12/2016 | Ford et al. |
| 2016/0379208 A1 | 12/2016 | Deliwala et al. |
| 2017/0011394 A1* | 1/2017 | Kumar ............... G06Q 20/401 |
| 2017/0017936 A1 | 1/2017 | Bisikalo et al. |
| 2017/0024817 A1 | 1/2017 | Wager et al. |
| 2017/0046664 A1 | 2/2017 | Haldenby et al. |
| 2017/0046698 A1 | 2/2017 | Haldenby et al. |
| 2017/0083910 A1 | 3/2017 | Kraemer et al. |
| 2017/0091750 A1* | 3/2017 | Maim ...................... H04L 9/30 |
| 2017/0103385 A1 | 4/2017 | Wilson, Jr. et al. |
| 2017/0132621 A1* | 5/2017 | Miller ............... G06Q 20/065 |
| 2017/0148016 A1 | 5/2017 | Davis |
| 2017/0154331 A1* | 6/2017 | Voorhees ............ H04L 67/20 |
| 2017/0178237 A1 | 6/2017 | Wong |
| 2017/0200137 A1 | 7/2017 | Vilmont |
| 2017/0228547 A1 | 8/2017 | Smith et al. |
| 2017/0243193 A1 | 8/2017 | Manian et al. |
| 2017/0250801 A1 | 8/2017 | Chen et al. |
| 2017/0300877 A1 | 10/2017 | Mann et al. |
| 2017/0316390 A1 | 11/2017 | Smith et al. |
| 2017/0324715 A1 | 11/2017 | Frincu et al. |
| 2018/0025670 A1 | 1/2018 | Ikarashi et al. |
| 2018/0034810 A1 | 2/2018 | Pe'er et al. |
| 2018/0109377 A1 | 4/2018 | Fu |
| 2018/0123780 A1 | 5/2018 | Ikarashi |
| 2018/0176017 A1 | 6/2018 | Rodriguez et al. |
| 2018/0176222 A1 | 6/2018 | Bhaskar et al. |
| 2018/0225431 A1 | 8/2018 | Ikarashi et al. |
| 2018/0240107 A1 | 8/2018 | Andrade |
| 2018/0247191 A1 | 8/2018 | Katz et al. |
| 2018/0341648 A1* | 11/2018 | Kakavand ............ G06Q 50/18 |
| 2018/0349572 A1 | 12/2018 | Chen et al. |
| 2018/0367298 A1 | 12/2018 | Wright et al. |
| 2019/0014094 A1 | 1/2019 | Le Saint |
| 2019/0034936 A1 | 1/2019 | Nolan et al. |
| 2019/0080321 A1 | 3/2019 | Mundis et al. |
| 2019/0080404 A1 | 3/2019 | Molinari et al. |
| 2019/0080406 A1 | 3/2019 | Molinari et al. |
| 2019/0130368 A1 | 5/2019 | Li et al. |
| 2019/0149337 A1 | 5/2019 | Savanah et al. |
| 2019/0158470 A1 | 5/2019 | Wright et al. |
| 2019/0188793 A1 | 6/2019 | Molinari et al. |
| 2019/0199531 A1 | 6/2019 | Staples et al. |
| 2019/0220859 A1 | 7/2019 | Weight et al. |
| 2019/0229911 A1 | 7/2019 | Allen |
| 2019/0238334 A1 | 8/2019 | Nakamura |
| 2019/0340352 A1 | 11/2019 | Peeters et al. |
| 2019/0349733 A1 | 11/2019 | Nolan et al. |
| 2019/0392118 A1 | 12/2019 | Elden et al. |
| 2019/0392536 A1 | 12/2019 | Rice |
| 2020/0026785 A1 | 1/2020 | Patangia et al. |

FOREIGN PATENT DOCUMENTS

| | | |
|---|---|---|
| CN | 101447980 A | 6/2009 |
| CN | 103440209 A | 12/2013 |
| CN | 103927656 A | 7/2014 |
| CN | 104320262 A | 1/2015 |
| DE | 102010002241 B4 | 3/2012 |
| EP | 1477882 A2 | 11/2004 |
| EP | 2538606 A1 | 12/2012 |
| EP | 2975570 A1 | 1/2016 |
| EP | 3010176 A1 | 4/2016 |
| FR | 3018370 A1 | 9/2015 |
| FR | 3018377 A1 | 9/2015 |
| FR | 3018378 A1 | 9/2015 |
| FR | 3018379 A1 | 9/2015 |
| JP | H11239124 A | 8/1999 |
| JP | H11289324 A | 10/1999 |
| JP | 2000502553 A | 2/2000 |
| JP | 2001195479 A | 7/2001 |
| JP | 2002026895 A | 1/2002 |
| JP | 2006293764 A | 10/2006 |
| JP | 2007242221 A | 9/2007 |
| JP | 2008146601 A | 6/2008 |
| JP | 200915824 A | 5/2009 |
| JP | 2009526411 A | 7/2009 |
| JP | 2010503320 A | 1/2010 |
| JP | 2010219912 A | 9/2010 |
| JP | 2011082662 A | 4/2011 |
| JP | 2011211461 A | 10/2011 |
| JP | 2014068140 A | 4/2014 |
| JP | 2015536617 A | 12/2015 |
| JP | 5858506 B1 | 2/2016 |
| RU | 2015108134 A | 10/2016 |
| RU | 2015109271 A | 10/2016 |
| TW | 201202975 A | 1/2012 |
| WO | 2005096542 A1 | 10/2005 |
| WO | 2005107141 A1 | 11/2005 |
| WO | 2007113040 A1 | 10/2007 |
| WO | 2012039474 A1 | 3/2012 |
| WO | 2012054785 A1 | 4/2012 |
| WO | 2013053058 A1 | 4/2013 |
| WO | 2015127789 A1 | 9/2015 |
| WO | 2015142765 A1 | 9/2015 |
| WO | 2015171580 A1 | 11/2015 |
| WO | 2015175854 A2 | 11/2015 |
| WO | 2015188151 A1 | 12/2015 |
| WO | 2016137360 A2 | 9/2016 |
| WO | 2016161073 A1 | 10/2016 |

OTHER PUBLICATIONS

Antonopoulos, Mastering Bitcoin: unlocking digital cryptocurrencies, Dec. 2014, O'Reilly Media, Inc. (Year: 2014).*

Flood et al., Contract as Automaton: The Computational Representation of Financial Agreements, Mar. 26, 2015, Office of Financial Research Working Paper (Year: 2015).*

Christidis, Blockchains and Smart Contracts for the Internet of Things, IEEE (Year: 2016).*

BlueMatt, Contract (Year: 2015).*

Allison, "Symbiont's Adam Krellenstein: There's really only two smart contract systems—Ethereum's and ours," International Business Times, https://www.ibtimes.co.uk/symbionts-adam-krellenstein-theres-really-only-two-smart-contract-systems-ethereums-ours-1530490, Nov. 25, 2015 [retrieved Dec. 12, 2018], 4 pages.

Antonopoulos, "Mastering Bitcoin—Unlocking Digital Cryptocurrencies," O'Reilly Media, Inc., Dec. 20, 2014, 282 pages.

bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.

(56) References Cited

OTHER PUBLICATIONS

Bitfury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.
Brown et al., "Standards for Efficient Cryptography 1: Elliptic Curve Cryptography Version 2.0," Certicom Research, May 21, 2009, 144 pages.
Brown et al., "Standards for Efficient Cryptography 2: Recommended Elliptic Curve Domain Parameters Version 2.0," Certicom Research, Jan. 27, 2010, 37 pages.
Campagna et al., "Standards for Efficient Cryptography 4: Elliptic Curve Qu-Vanstone Implicit Certificate Scheme (ECQV) Version 1.0," Certicom Research, Jan. 24, 2013, 32 pages.
Coinprism, "80 bytes OP_RETURN explained," Coinprism Blog, http://blog.coinprism.com/2015/02/11/80-bytes-op-return/, Feb. 11, 2015 [retrieved Dec. 21, 2018], 8 pages.
Corallo, "[Bitcoin-development] Relative CHECKLOCKTIMEVERIFY (was CLTV proposal)," Linux Foundation, https://lists.linuxfoundation.org/pipermail/bitcoin-dev/2015-May/007858.html, May 4, 2015 [retrieved Dec. 12, 2018], 3 pages.
Decker, "[BIP] Normalized transaction IDs," Bitcoin-Dev, https://bitcoin-development.narkive.com/DjOYjEig/bip-normalized-transaction-ids, Oct. 19, 2015 [retrieved Dec. 12, 2018], 16 pages.
Drcode,"New Kid on the Blockchain," Hacker News, https://news.ycombinator.com/item?id=11372455, Mar. 28, 2016 [Dec. 12, 2018], 32 pages.
Eragmus et al., "Time to lobby Bitcoin's core devs: "SF Bitcoin Devs Seminar—Scalability to billions of transactions per day, satoshi-level Micropayments, near-zero risk of custodial theft, & Instant transactions" . . . but only w/ a malleability-fixing soft fork," Reddit r/bitcoin, https://www.reddit.com/r/Bitcoin/comments/2z2l91/time_to_lobby_bitcoins_core_devs_sf_bitcoin_devs/, Mar. 14, 2015 [Dec. 12, 2018], 21 pages.
Familiar et al., "Transcript for #bitcoin-dev Mar. 27, 2015," BitcoinStats, http://bitcoinstats.com/irc/bitcoin-dev/logs/2015/03/27, Mar. 27, 2015 [archived version Jun. 27, 2016], 11 pages.
Flood et al., "Contract as Automaton: The Computational Representation of Financial Agreements," Office of financial Research Working Paper No. 15-04, Mar. 26, 2015, 25 pages.
Friedenbach et al., "Freimarkets: extending bitcoin protocol with user-specified bearer instruments, peer-to-peer exchange, off-chain accounting, auctions, derivatives and transitive transactions," Version v0.01, http://freico.in/docs/freimarkets-v0.0.1.pdf, Aug. 24, 2013 [retrieved Dec. 12, 2018], 25 pages.
Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.
International Search Report and Written Opinion dated Apr. 26, 2017, International Patent Application No. PCT/IB2017/050865, filed Feb. 16, 2017, 9 pages.
International Search Report and Written Opinion dated May 29, 2017, International Patent Application No. PCT/IB2017/050815, filed Feb. 14, 2017, 10 pages.
Killerstorm et al., "Transcript for #bitcoin-dev Sep. 3, 2012," BitcoinStats, http://www.bitcoinstats.com/irc/bitcoin-dev/logs/2012/09/03, Sep. 3, 2012 [retrieved Dec. 21, 2018], 14 pages.
Koblitz et al., "Cryptocash, Cryptocurrencies, and Cryptocontracts," Designs, Codes and Cryptography 78 (1):87-102, publication available online Oct. 1, 2015, print publication Jan. 2016.
Krawczyk, "HMQV: A High-Performance Secure Diffie-Hellman Protocol," Annual International Cryptology Conference 2005, Aug. 14, 2005, first disclosed online Jul. 5, 2005, 66 pages.
Krellenstein, "The Counterparty Protocol," GitHub, https://github.com/jsimnz/Counterparty/blob/master/README.md, Jan. 8, 2014 [Dec. 12, 2018], 4 pages.
Maxwell et al., "Deterministic wallets," Bitcoin Forum, https://bitcointalk.org/index.php?topic=19137.0;all, Jun. 18, 2011 [retrieved Dec. 10, 2018], 104 pages.

Openssl Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.
Openssl Wiki, "EVP Key Agreement," OpenSSL, https://wiki.openssl.org/index.php/EVP_Key_Agreement, Apr. 28, 2017 [retrieved Dec. 10, 2018], 2 pages.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Pornin, "Deterministic Usage of the Digital Signature Algorithm (DSA) and Elliptic Curve Digital Signature Algorithm (ECDSA)," Request for Comments: 6979, Independent Submission, Aug. 2013, 79 pages.
Scott, "Counterparty to Create First Peer-to-Peer Digital Asset Exchange Platform," Cointelegraph, https://cointelegraph.com/news/counterparty_to_create_first_peer_to_peer_digital_asset_exchange_platform, Apr. 10, 2014 [retrieved Dec. 12, 2018], 2 pages.
Tasca et al., "Digital Currencies: Principles, Trends, Opportunities, and Risks," ECUREX Research Working Paper, Sep. 7, 2015 (Oct. 2015 version), 110 pages.
TIMEISNOW77724 et al., "Help understanding counterparty, thanks in advance!," Reddit r/counterparty_xcp, https://www.reddit.com/r/counterparty_xcp/comments/2qntze/help_understanding_counterparty_thanks_in_advance/, Dec. 28, 2014 [retrieved Dec. 11, 2018], 4 pages.
UK Commercial Search Report dated Jun. 27, 2016, Patent Application No. GB1603123.9, filed Feb. 23, 2016, 11 pages.
UK Commercial Search Report dated Jun. 27, 2016, Patent Application No. GB1603125.4, filed Feb. 23, 2016, 11 pages.
UK Commercial Search Report dated Jun. 28, 2016, Patent Application No. GB1603122.1, filed Feb. 23, 2016, 12 pages.
UK Commercial Search Report dated Jun. 9, 2016, Patent Application No. GB1603117.1, filed Feb. 23, 2016, 12 pages.
UK Commercial Search Report dated May 24, 2016, Patent Application No. GB1605571.7, filed Apr. 1, 2016, 3 pages.
UK Commercial Search Report dated May 9, 2016, Patent Application No. GB1603114.8, filed Feb. 23, 2016, 2 pages.
UK IPO Search Report dated Jul. 26, 2016, Patent Application No. GB1603114.8, filed Feb. 23, 2016, 5 pages.
UK IPO Search Report dated Jul. 4, 2016, Patent Application No. GB1603125.4, filed Feb. 23, 2016, 6 pages.
UK IPO Search Report dated Jul. 5, 2016, Patent Application No. GB1603123.9, filed Feb. 23, 2016, 5 pages.
UK IPO Search Report dated Oct. 17, 2016, Patent Application No. GB1603117.1, filed Feb. 23, 2016, 5 pages.
UK IPO Search Report dated Oct. 26, 2016, Patent Application No. GB1603122.1, filed Feb. 23, 2016, 4 pages.
UK IPO Search Report dated Sep. 9, 2016, Patent Application No. GB1605571.7, filed Apr. 1, 2016, 5 pages.
Whitequark, "#bitcoin-wizards on Jul. 30, 2015—irc logs at whitequark.org," whitequark.org, https://irclog.whitequark.org/bitcoin-wizards/2015-07-30, Jul. 30, 2015 [retrieved Dec. 12, 2018], 8 pages.
Wood, "Ethereum: A Secure Decentralised Generalised Transaction Ledger: Final Draft—Under Review," Etereum Project Yellow Paper, http://tech.lab.carl.pro/kb/ethereum/yellowpaper, Apr. 2014, 32 pages.
Wright, "Registry and Automated Management Method for Blockchain Enforced Smart Contracts," U.S. Appl. No. 15/138,717, filed Apr. 26, 2016.
Flood, Mark D., and Oliver R. Goodenough. Contract as automaton: the computational representation of financial agreements. Office of Financial Research Working Paper 15-04 (2015).
Antonopoulos, Andreas M. Mastering, Bitcoin: unlocking digital cryptocurrencies. O'Reilly Media, Inc., 2014.
Gitbook, "Ethereum Frontier Guide," Gitbook (Legacy), Feb. 4, 2016, 293 pages.
International Search Report and Written Opinion dated Apr. 3, 2017, Patent Application No. PCT/IB2017/050824, filed Feb. 14, 2017, 13 pages.

(56) References Cited

OTHER PUBLICATIONS

Reiner et al., "Bitcoin Wallet Identity Verification Specification," diyhpluswiki, http://diyhpl.us/-bryan/papers2/bitcoin/armory-verisign-bitcoin-wallet-identityspecification.pdf, Feb. 27, 2015 (retrieved Jan. 27, 2016), 24 pages.
Third-Party Submission Under 37 CFR 1.290 dated Jun. 12, 2019, U.S. Appl. No. 16/079,089, filed Aug. 22, 2018, 19 pages.
Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23, 2017), 9 pages.
"Bitcoin Developer Guide," Bitcoin Project, https://web.archive.org/web/20160515171209/https://bitcoin.org/en/developer-guide, May 15, 2016 [retrieved Mar. 13, 2019], 55 pages.
Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.
Charlon et al., "Open-Assests-Protocol," Github.com, Nov. 17, 2015 [retrieved Jan. 30, 2017], https://github.com/OpenAssets/open-assets-protocol/blob/master/specification.mediawiki, 5 pages.
Counterparty, "Home page," Counterparty, copyright 2018 [retrieved Jan. 13, 2020], counterparty.io, 3 pages.
Dorier, "Colored Coins and Ricardian Contracts," Coinprism Blog, Dec. 10, 2014 [retrieved Jan. 30, 2017], http://blog.coinprism.com/2014/12/10/colored-coins-and-ricardian-contracts/, 9 pages.
European Communication pursuant to Article 94(3) EPC dated Jan. 2, 2020, Patent Application No. 18166910.2-1218, filed Feb. 16, 2017, 4 pages.
European Communication pursuant to Article 94(3) EPC dated Jul. 1, 2019, Application No. 17707121.4-1218, filed Feb. 14, 2017, 6 pages.
Extended European Search Report dated Jul. 18, 2018, Patent Application No. 18166910.2-1218, filed Feb. 16, 2017, 8 pages.
Fimkrypto, "FIMK 0.6.4 Released," Github.com, Feb. 11, 2016 [retrieved Jan. 30, 2017], https://github.com/fimkrypto/fimk/releases, 17 pages.
Gennaro et al., "Threshold-Optimal DSA/ECDSA Signatures and an Application to Bitcoin Wallet Security," International Conference on Applied Cryptography and Network Security, Jun. 9, 2016, 42 pages.
Gutoski et al., "Hierarchical deterministic Bitcoin wallets that tolerate key leakage (Short paper)," Financial Cryptography and Data Security: 19th International Conference, FC 2015, Revised Selected Papers, Jan. 26, 2015, 9 pages.
Hao, "On Robust Key Agreement Based on Public Key Authentication," International Conference on Financial Cryptography and Data Security, Jan. 25, 2010, 12 pages.
Harayama et al., "Key escrow method of personal decryptographic key by using elliptic curve calculation," Institute of Electronics, Information and Communication Engineers (IEICE) Technical Report 109(85):91-96, Jun. 11, 2009.
International Search Report and Written Opinion dated May 31, 2017, Patent Application No. PCT/IB2017/050856, filed Feb. 16, 2017, 11 pages.
Japanese Office Action dated Jan. 22, 2019, Patent Application No. 2018-516682, filed Feb. 16, 2017, 14 pages.
Kravchenko, "Distributed multi-ledger model for financial industry," Github.com, Oct. 21, 2015 [retrieved Jan. 30, 2017], https://github.com/WebOfTrustInfo/rebooting-the-web-of-trust/blob/master/topics-andadvance-readings/DistributedMulti-ledgerModelForFinancialIndustry.md, 2 pages.
Mainelli, "Blockchain: why smart contracts need shrewder people," Banking Technology, Apr. 4, 2016 [retrieved Jan. 30, 2017], http://www.bankingtech.com/461572/blockchain-why-smart-contracts-need-shrewderpeople/, 3 pages.
McCorry et al., "Authenticated Key Exchange over Bitcoin," International Conference on Research in Security Standardisation 2015, Dec. 15, 2015, 18 pages.
Ryepdx et al., "Answer to 'What is the Global Registrar?'," Ethereum Stack Exchange, Feb. 26, 2016 [retrieved Jan. 30, 2017], http://ethereum.stackexchange.com/questions/1610/what-is-the-global-registrar, 3 pages.
Sevareid et al., "Use Case Asset Depository," Github.com, Jan. 11, 2016 version (last edited May 5, 2016) [retrieved Jan. 30, 2017], https://github.com/hyperledger/hyperledger/wiki/Use-Case-Asset-Depository, 4 pages.
Swanson, "Great Chain of Numbers: Chapter 3: Next Generation Platforms," Great Wall of Numbers, Mar. 4, 2014 [retrieved Jan. 30, 2017], http://www.ofnumbers.com/2014/03/04/chapter-3-next-generation-platforms/, 25 pages.
Tuesta et al., "Smart contracts: the ultimate automation of trust?," BBVA Research Financial Inclusion Unit, Oct. 2015, 5 pages.
UK Commercial Search Report dated Apr. 25, 2016, Patent Application No. 11603117.1, filed Feb. 23, 2016, 11 pages.
UK Commercial Search Report dated Sep. 30, 2016, Patent Application No. 1606630.0, filed Apr. 15, 2016, 7 pages.
UK IPO Search Report dated Dec. 12, 2016, Patent Application No. GB1606630.0, filed Apr. 15, 2016, 4 pages.
Vayngrib, "Future, operating business on chain," Github.com, May 4, 2015 [retrieved Jan. 30, 2017], https://github.com/tradle/about/wiki/Future,-operating-business-on-chain, 9 pages.
Vietnamese Office Action dated Sep. 27, 2018, Patent Application No. 1-2018-03358, filed Feb. 16, 2017, 2 pages.
Walport et al., "Distributed Ledger Technology: beyond block chain—A report by the UK Government Chief Scientific Adviser," United Kingdom Government Office for Science, Dec. 2015, 88 pages.
Weller et al., "CounterpartyXCP/Documentation: Protocol Specification," Github.com, Jan. 25, 2015 (last edited Jun. 17, 2019) [retrieved Jan. 13, 2020], 10 pages.
Wikipedia, "Counterparty (platform)," last edited Dec. 6, 2019 [retrieved Jan. 13, 2020], 2 pages.
Wikipedia, "Shamir's Secret Sharing," Wikipedia the Free Encyclopedia, Jan. 20, 2017 version [retrieved on Jan. 9, 2019], https://en.wikipedia.org/w/index.php?title=Shamir's_Secret_Sharing&oldid=761082071, 6 pages.
Wikipedia, "Shamir's Secret Sharing," Wikipedia the Free Encyclopedia, Mar. 6, 2016 version [retrieved on Jun. 24, 2019], https://en.wikipedia.org/w/index.php?title=Shamir's_Secret_Sharing&oldid=708636892, 6 pages.
Zhang et al., "AntShare Trading Platform," Github.com, Jun. 3, 2016 (last edited Aug. 21, 2016) [retrieved Jan. 30, 2017], https://github.com/AntShares/AntShares/wiki/Whitepaper-1.1, 9 pages.
Zyskind et al., "Decentralizing Privacy: Using a Blockchain to Protect Personal Data," 2015 IEEE CS Security and Privacy Workshops, May 21, 2015, 5 pages.
Zyskind et al., "Enigma: Decentralized Computation Platform with Guaranteed Privacy," arXiv preprint arXiv:1506, Jun. 10, 2015, 14 pages.
Abeikverdi et al., "Generating interactive, secure miltiple ECC key pairs deterministically," StackExchange, http://crypto.stackexchange.com/questions/25191/generating-interactivesecure-multiple-ecc-key-pairs-deterministically, Apr. 23, 2015 [retrieved Dec. 26, 2016], 2 pages.
Bitfreaki et al., "Understanding Stealth Addresses/Payments," Bitcoin Forum, Jun. 10, 2015 (retrieved Jun. 16, 2020), https://bitcointalk.org/index.php?topic=1086498.0, 8 pages.
Burgess et al., "The Promise of Bitcoin and the Blockchain," Consumers' Research, Jul. 13, 2015, 97 pages.
Buterin, "Bitcoin Multisig Wallet: The Future Of Bitcoin," Bitcoin Magazine, Mar. 13, 2014 [retrieved May 12, 2020], https://bitcoinmagazine.com/articles/multisig-future-bitcoin-1394686504, 7 pages.
Danda et al., "hd-wallet-addrs," GibHub, https://github/com/danda/hd-wallets-addrs, Dec. 30, 2015 [retrieved Mar. 11, 2016], 7 pages.
Danda et al., "Is there any service/api for deriving HD wallet addresses from a master public key?," StackExchange, http://bitcoin.stackexchange.com/questions/38887/is-there-any-service-api-for-deriving-hdwallet-addresses-from-a-master-public-k, Jul. 30, 2015, 2 pages.

(56) References Cited

OTHER PUBLICATIONS

Danda, "Help / FAQ," MyBitPrices, https://mybitprices.info/hd-wallet-addrs.html, Jan. 1, 2016 [retrived Mar. 11, 2016], 4 pages.
Das, "As Exchanges Pause Withdrawals, Chinese Bitcoin Investors Switch to P2P Trading," CCN, Feb. 13, 2017 [retrived May 12, 2020], https://www.ccn.com/chinese-bitcoin-investors-switch-p2p-trading-exchanges-pause-withdrawals/, 4 pages.
Dash et al., "bips/bip-0047.mediawiki," Github, Feb. 24, 2016 (retrieved Jun. 16, 2020), https://github.com/bitcoin/bips/blob/15c0b250cb5b77eba3ea709b082d7da6a310d991/bip-0047.mediawiki, 16 pages.
Dixon, "True peer-to-peer currency exchange?," DGC Magazine, Jul. 2, 2013 [retrieved May 12, 2020], http://dgcmagazine.com/true-peer-to-peer-currency-exchange/, 6 pages.
Gautham, "Bitwage Makes Bitcoin Payroll Easier with New Features," NewsBTC, Mar. 9, 2016 (retrieved Jun. 16, 2020), https://www.newsbtc.com/2016/03/09/bitwage-makes-bitcoin-payroll-easier-new-features/, 4 pages.
Goldfeeder et al., "Securing Bitcoin wallets via threshold signatures" Princeton's Center for Informationo Technology Policy, Mar. 28, 2014, 11 pages.
Goldfeeder et al., "Threshold signatures and Bitcoin wallet security: A menu of options," Freedom to Tinker, May 23, 2014 [retrieved Nov. 16, 2020], https://freedom-to-tinker.com/2014/05/23/threshold-signatures-and-bitcoin-wallet-security-a-menu-of-options/, 3 pages.
International Search Report and Written Opinoin dated Apr. 12, 2017, Patent Application No. PCT/IB2017/050829, 9 pages.
International Search Report and Written Opinion dated Apr. 3, 2017, Patent Application No. PCT/IB2017/050827, 10 pages.
International Search Report and Written Opinion dated May 31, 2017, Patent Application No. PCT/IB2017/050867, 11 pages.
International Search Report and Written Opinion dated May 31, 2017, Patent Application No. PCT/IB2017/050979, filed Feb. 21, 2017, 11 pages.
Japanese Office Action dated Oct. 6, 2020, Patent Application No. 2018-539865, 14 pages.
Jesionek et al., "BIP0032: Hierarchical Deterministic Wallets," GitHub, https://github.com/bitcoin/bips/blob/master/bip-0032.mediawiki, Jan. 2014, 9 pages.
I2012 et al., "MinAddress : Now remember your addresses easily," BitCoinTalk, Sep. 16, 2014 (retrieved Jun. 16, 2020), https://bitcointalk.org/index.php?topic=77471.150;wap2, 3 pages.
Kosba et al., "Hawk: The Blockchain Model of Cryptography and Privacy-Preserving Smart Contracts,"IEEE Symposium on Security and Privacy, May 22, 2016, 31 pages.
Mezzomix et al., "Angebat: BTC (2-aus-3) Multisig Escrow (Treuhandabwicklung), "Bitcoin Forum, Feb. 9, 2014, https://bitcointalk.org/index.php?topic=456563.0, 7 pages.
Mike et al., "Contract, " Bitcoin Wiki, Oct. 22, 2015 version (first disclosed May 22, 2011) [retrieved May 12, 2020], https://en.bitcoin.it/w/index.php?title=Contract&oldid=59172, 11 pages.
Mrbanddrews, "Bitcoin Core o.11 (ch 2): Data Storage, " Bitcoin Wiki, Jan. 13, 2016 (last revision Jan. 21, 2016) [retrieved May 8, 2020], https://en.bitcoin.it/w/index.php?title=Bitcoin_Core_0.11_(ch_2):_Data_storage&oldid=60024, 10 pages.
Openchain, "Home Page," Openchain.org, Dec. 22, 2015 [retrieved May 8, 2020], https://web.archive.org/web/20151222083734/https://www.openchain.org/, 18 pages.
Perry, "Tapeke: Bitcoin Accounting for Non-Accountants," http://codinginmysleep.com/tapeke-bitcoin-accounting-for-non-accountants/, Jan. 21, 2015, 1 page.
Reddit, "Could Microsoft use the blockchain as a license key for its software?, " r/Bitcoin, Sep. 7, 2015 [retrieved May 8, 2020], https://www.reddit.com/r/Bitcoin/comments/3jz09c/could_microsoft_use_the_blockchain_as_a_license_?st=iw26pndq&sh=b862bf7d, 2 pages.
Sanchez, "Marketplaces, " GitHub, Jun. 10, 2015 [retrieved May 12, 2020], https://github.com/drwasho/openbazaar-documentation/blob/master/04%20marketplaces.md, 37 pages.

Snow et al., "Factom: Business Processes Secured by Immutable Audit Trails on the Blockchain Version 1.2," factom.com, Apr. 25, 2018, 38 pages.
Stampery, "FFeatures: Blockchain-based data certification at your fingertips," Stampery.com, https://stampery.com/features/, archived Mar. 5, 2016 [retrieved Nov. 3, 2016], 4 pages.
Sullivan et al., "Peer-to-peer Affine Commitment using Bitcoin," Carnegie Mellon University, Jun. 17, 2015, 54 pages.
Taiwanese Office Action dated Oct. 7, 2020, Patent Application No. 1061005713, 4 pages.
UK Commercial Search Report dated Jun. 6, 2016, Patent Application No. 1604497.6, filed Mar. 16, 2016, 6 pages.
UK Commercial Search Report dated May 20, 2016, Patent Application No. 1605026.2, 4 pages.
UK Commercial Search Report dated Nov. 30, 2016, Patent Application No. 1607058.3, filed APr. 22, 2016, 7 pages.
UK Expanded Commercial Search Report dated Jun. 15, 2016, Patent Application No. 1605026.2, 5 pages.
UK IPO Search Report dated Dec. 21, 2016, Patent Application No. GB1607058.3, filed Apr. 22, 2016, 3 pages.
UK IPO Search Report dated Dec. 28, 2016, Patent Application No. GB1604497.6, filed Mar. 16, 2016, 4 pages.
UK IPO Search Report dated Jan. 25, 2017, Patent Application No. 1605026.2, 3 pages.
Vayngrib, "DHT hardening," GitHub, https://github.com/tradle/about/wiki/DHT-hardening, Feb. 2, 2015 (last updated May 21, 2015) [retrieved Dec. 13, 2018], 5 pages.
Watanabe et al., "Blockchain contract: A complete consensus using blockchain," IEEE 4th Global Conference on Consumer Electronics, Oct. 27, 2015, 3 pages.
Willet et al., "Omni Protocol Specification (formerly Mastercoin), " Github, Nov. 5, 2013 [retrieved May 12, 2020], https://github.com/OmniLayer/spec/blob/9978cc3984ae0b6e51216c4ae74042fc4097b99/README.md, 69 pages.
Willoms et al., "Using blockchain to save and verify software Licensing," Bitcoin Forum, https://bitcointalk.org.index.php?topic=671435.0, Jun. 30, 2014 [retrieved Dec. 13, 2018], 3 pages.
Andersen, "Blockchain Technology: A game-changer in accounting?, " Deloitte & Touche GmbH Wirtschaftspruüfungsgesellschaft, Mar. 2016, 5 pages.
Andersen et ala., "Relay OP_RETURN data TxOut as standard transaction type, #2738, " Github, Jun. 4, 2013, https://github.com/bitcoin/pull/2738, 12 pages.
Anonymous, "Bitsquare—The decentralised bitcoin exchange," Bitsquare.io, Jan. 3, 2016, 14 pages.
Anonymous, "Homepage," website operational as of 2017 [retrieved Nov. 30, 2020], https://www.coinffeine.com/, 2 pages.
Friedenbach, "[Bitcoin-development] New Output Script Type," Linux Foundation, Sep. 14, 2013, https://lists.inuxfoundation.org/pipermail/bitcoin-dev/2013-September/003256.html, 2 pages.
International Search Report and Written Opinion dated Apr. 12, 2017, Patent Application No. PCT/IB2017/050866, 10 pages.
International Search Report and Written Opinion dated Mar. 30, 2017, Patent Application No. PCT/IB2017/050825, 9 pages.
International Search Report and Written Opinion dated May 31, 2017, Patent Application No. PCT/IB2017/050980, 12 pages.
Japanese Notice of Reason(s) for Rejection dated Mar. 30, 2021, Patent Application No. 2018-539890, 8 pages.
Japanese Notice of Reason(s) for Rejection dated Mar. 30, 2021, Patent Application No. 2018-539893, 6 pages.
Japanese Office Action dated Feb. 16, 2021, Patent Application No. 2018-539331, 7 pages.
Menezes et al., "Handbook of Applied Cryptography: pages 33, 38, " CRC Press, Oct. 16, 1996, 3 pages.
Sardesai, "Coinffeine: A P2P Alternative to Centralised Bitcoin Exchanges," Cryptocoins News, Mar. 2, 2014 [retrieved Feb. 14, 2017], https://www.cryptocoinsnews.com/coinffeine-p2p-alternative-centralised-bitcoin-exchanges/, 5 pages.
Taiwanese Office Action dated Jul. 28, 2020, Patent Application No. 106105709, 9 pages.
UK Commercial Search Report dated Feb. 17, 2017, Patent Application No. 1604493.5, 8 pages.

(56) References Cited

OTHER PUBLICATIONS

UK Commercial Search Report dated Jan. 13, 2017, Patent Application No. 1604498.4, 8 pages.
UK Commercial Search Report dated Jun. 14, 2016, Patent Application No. 1607249.8, 4 pages.
UK IPO Search Report dated Dec. 5, 2016, Patent Application No. 1607249.8, 4 pages.
UK IPO Search Report dated Dec. 6, 2016, Patent Application No. 1604493.5, 6 pages.
UK IPO Search Report dated Dec. 6, 2016, Patent Application No. 1607482.5, 5 pages.
UK IPO Search Report dated Jan. 3, 2017, Patent Application No. 1604498.4, 4 pages.

* cited by examiner

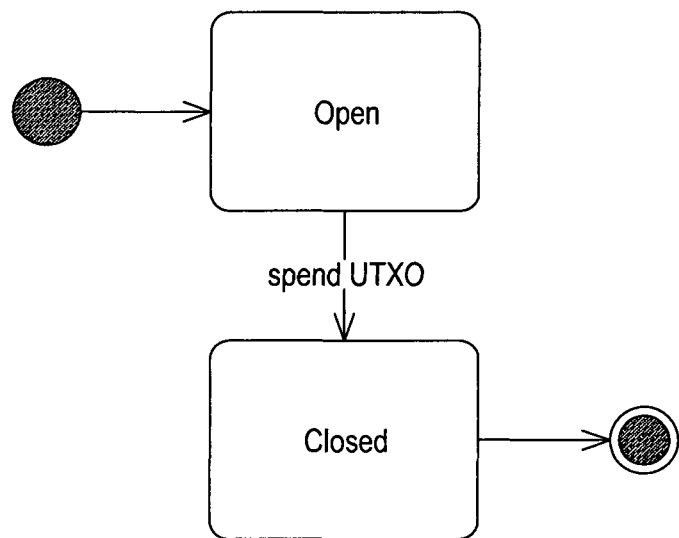

Fig. 2a

Scenario Definition
Bob: Wish to register my house onto the Blockchain
House Base Metadata

| Field | Sub-field | Bytes | Value | Comments |
|---|---|---|---|---|
| Asset Metadata A | ContractType | 4 | 0x0000FF04 | Indicates unit |
|  | ContractPointer | 16 | xxxx.xxxx.xxxx.xxxx (...) .xxxx | Address of the *Asset Definiton* file |
|  | Padding | 12 |  | Spare |
| Asset Metadata B | ContractHash | 20 | ###################... | Hash of the *Asset Definiton* file (not the tokenisation!) |
|  | Juristiction | 2 | EN | Specifies that the asset is covered by English law |
|  | Options | 2 | 0x0000 | No options specified |
|  | Padding | 8 |  | Spare |

Fig. 2b

| Bob's Publication | |
|---|---|
| This is the transaction to publish the ownership of the asset onto the Blockchain; this is a fairly straight-forward transaction | |
| BOB-S1-T1 | Transaction-ID |
| Version number | Version number |
| 1 | Number of inputs |
| <Bob's previous unspent BTC output - assume 500,000 satoshi> | Prev Trans Output |
| IDX-00 | Prev Trans Output Index |
| Script length | Script length |
| Sig-Bob PubK-Bob | ScriptSig |
| Sequence number | Sequence number |
| 1 | Number of outputs |
| 2,000 | Output value |
| Output script length | Output script length |
| OP_HASH160 <redeem script hash> OP_EQUAL | Output script <<< Redeem Script: allowing Bob to cancel the contract at any time OP_1 AssetMetaDataA AssetMetadataB PubK-Bob OP_3 OP_CHECKMULTISIG |
| 498,000 | Output value |
| Output script length | Output script length |
| OP_DUP OP_HASH160 <PubK-Bob Hash> OP_EQUALVERIFY OP_CHECKSIG | Output script |
| LockTime | LockTime |

Fig. 2c

| When Bob gets rid of the asset, or no longer wants it public (or semi-public) knowledge, then he simply spends the transaction output ||
|---|---|
| Bob's Contract Cancellation ||
| BOB-S1-T2 | Transaction-ID |
| Version number | Version number |
| 1 | Number of inputs |
| BOB-S1-T1 | Prev Trans Output |
| IDX-00 | Prev Trans Output Index |
| Script length | Script length |
| Sig-Bob OP_1AssetMetadataA AssetMetadataB PubK-Bob OP_3 OP_CHECKMULTISIG | ScriptSig |
| Sequence number | Sequence number |
| 1 | Number of outputs |
| 1,000 | Output value |
| Output script length | Output script length |
| OP_DUP OP_HASH160<PubK-Bob Hash>OP_EQUALVERIFY OP_CHECKSIG | Output script |
| LockTime | LockTime |

Fig. 2d

Scenario Definition
Bob: Wish to create an asset with hidden ownership and publish it to the Blockchain House Base Metadata

| Field | Sub-field | Bytes | Value | Comments |
|---|---|---|---|---|
| Asset Metadata A | ContractType | 4 | 0x0000FF04 | Indicates unit |
| | ContractPointer | 16 | xxxx.xxxx.xxxx.xxxx (...) .xxxx | Address of the *Asset Definiton* file |
| | Padding | 12 | | Spare |
| Asset Metadata B | ContractHash | 20 | ##################... | Hash of the *Asset Definiton* file (not the tokenisation!) |
| | Juristiction | 2 | EN | Specifies that the asset is covered by English law |
| | Options | 2 | 0x0000 | No options specified |
| | Padding | 8 | | Spare |

Fig. 3a

| Bob's Funding of the Asset | |
|---|---|
| BOB-S2-T1 | |
| | |
| 1 | |
| <Bob's previous unspent BTC output - assume 500,000 satoshi> | |
| IDX-00 | |
| | |
| Sig-Bob PubK-Bob | |
| | |
| 2 | |
| 4,000 | Output value |
| | |
| OP_DUP OP_HASH160<PubK-Asset Hash>OP_EQUALVERIFY OP_CHECKSIG | |
| 496,000 | |
| Output script length | Output script length |
| OP_DUP OP_HASH160 <PubK-Bob Hash> OP_EQUALVERIFY OP_CHECKSIG | |

Fig. 3b

| Asset's Publication | Version number |
|---|---|
| ASSET-S2-T1 | |
| Version number | 1 |
| BOB-S2-T1 | |
| IDX-00 | |
| Sig-Asset PubK-Asset | |
| 2 | |
| 1,000 | |
| Redeem Script: requires both Bob and the Asset to cancel it OP_2 AssetMetaDataA AssetMetadataB PubK-Asset PubK-Bob OP_4 OP_CHECKMULTISIG >>>> | OP_HASH160 <Redeem script hash> OP_EQUAL |
| | 2,000 |
| | OP_DUP OP_HASH160 <PubK-AssetHash> OP_EQUALVERIFY OP_CHECKSIG |

Fig. 3c

| Contract Closure | |
|---|---|
| ASSET-S2-T2 | Transaction-ID |
| Version number | Version number |
| 1 | Number of inputs |
| ASSET-S2-T1 | Prev Trans Output |
| IDX-00 | Prev Trans Output Index |
| Script length | Script length |
| Sig-Asset Sig-Bob OP_2 AssetMetaDataA AssetMetadataB PubK-Asset PubK-Bob OP_4 OP_CHECKMULTISIG | ScriptSig |
| Sequence number | Sequence number |
| 1 | Number of outputs |
| 1,000 | Output value |
| Output script length | Output script length |
| OP_DUP OP_HASH160<PubK-Bob Hash>OP_EQUALVERIFY OP_CHECKSIG | Output script |
| LockTime | LockTime |

Fig. 3d

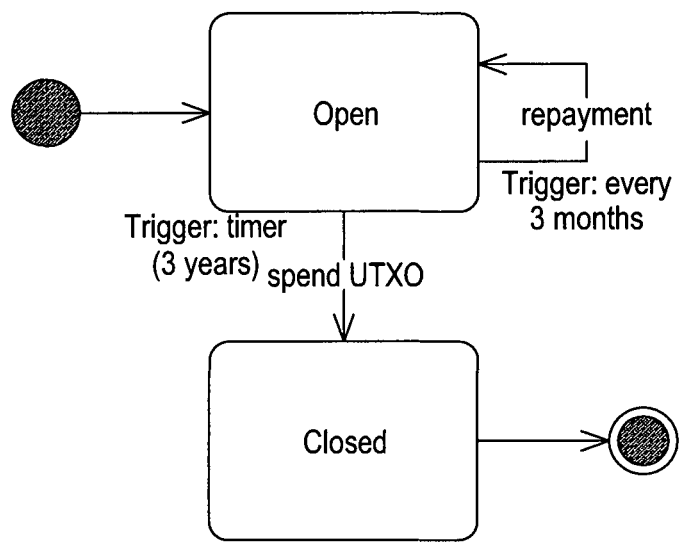

Fig. 4a

Scenario Definition
Bob:    I am leasing a car from Eve for a period of three years
Lease Base Metadata

| Field | Sub-field | Bytes | Value | Comments |
|---|---|---|---|---|
| Asset Metadata A | ContractType | 4 | 0x0000FF04 | Indicates unit |
| | ContractPointer | 16 | xxxx.xxxx.xxxx.xxxx (...) .xxxx | Address of the *Asset Definiton* file |
| | Padding | 12 | | Spare |
| Asset Metadata B | ContractHash | 20 | ################... | Hash of the *Asset Definiton* file (not the tokenisation!) |
| | Juristiction | 2 | EN | Specifies that the asset is covered by English law |
| | Options | 2 | 0x0000 | No options specified |
| | Padding | 8 | | Spare |

Fig. 4b

| | Eve's Creation of the Lease Contract | |
|---|---|---|
| | EVE-S3-T1 | Transaction-ID |
| | Version number | Version number |
| | 1 | Number of inputs |
| | <Eve's previous unspent BTC output - assume 500,000 satoshi> | Prev Trans Output |
| | IDX-00 | Prev Trans Output Index |
| | Script length | Script length |
| | Sig-Eve PubK-Eve | ScriptSig |
| | Sequence number | Sequence number |
| | 2 | Number of outputs |
| | 2,000 | Output value |
| | Output script length | Output script length |
| Redeem Script; requires simply Eve to close it (note that a solution requiring both Bob & Eve would also be possible) OP_1 AssetMetaDataA AssetMetadataB PubK-Eve OP_3 OP_CHECKMULTISIG | >>>> OP_HASH160 <Redeem script hash> OP_EQUAL | Output script |
| | 498,000 | Output value |
| | Output script length | Output script length |
| | OP_DUP OP_HASH160 <PubK-Eve Hash> OP_EQUALVERIFY OP_CHECKSIG | Output script |
| | LockTime | LockTime |
| | Eve's Timelocked Termination of the Contract | |
| | EVE-3-T2 | Transaction-ID |
| | Version number | Version number |
| | 1 | Number of inputs |
| | EVE-3-T1 | Prev Trans Output |
| | IDX-00 | Prev Trans Output Index |
| | Script length | Script length |
| | Sig-Eve OP_1 AssetMetaDataA AssetMetadataB PubK-Eve OP_3 OP_CHECKMULTISIG | ScriptSig |
| | Sequence number | Sequence number |
| | 1 | Number of outputs |
| | 2,000 | Output value |
| | Output script length | Output script length |
| | OP_DUP OP_HASH160 <PubK-Eve Hash> OP_EQUALVERIFY OP_CHECKSIG | Output script |
| NOTE: Transaction is submitted ahead of time rather than at the end of the three-year period | >>>> Date when EVE-S3-T1 was transmitted plus 3 years | LockTime |

Fig. 4c

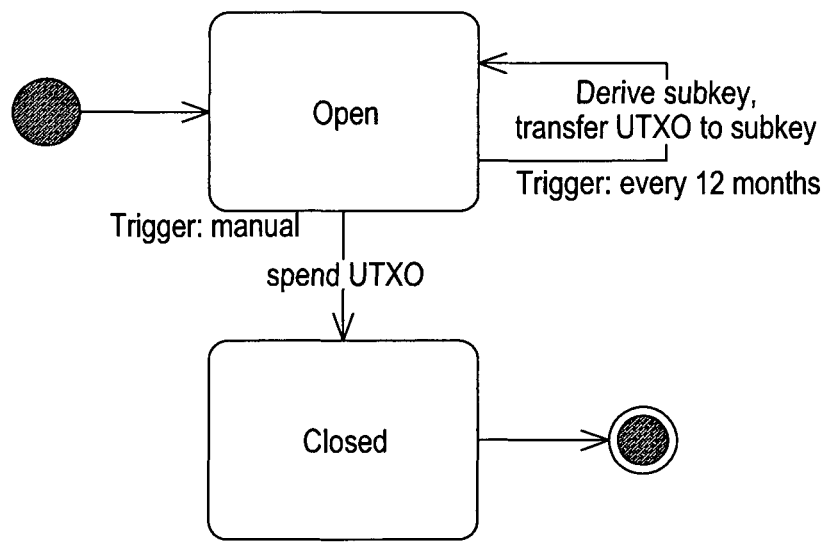

Fig. 5a

Scenario Definition
Bob:   I am leasing a house from Eve on an annual basis, but can cancel within 2 months of the anniversary
Lease Base Metadata

| Field | Sub-field | Bytes | Value | Comments |
|---|---|---|---|---|
| Asset Metadata A | ContractType | 4 | 0x0000FF04 | Indicates unit |
| | ContractPointer | 16 | xxxx.xxxx.xxxx.xxxx (...) .xxxx | Address of the *Asset Definiton* file |
| | Padding | 12 | | Spare |
| Asset Metadata B | ContractHash | 20 | ##################... | Hash of the *Asset Definiton* file (not the tokenisation!) |
| | Juristiction | 2 | EN | Specifies that the asset is covered by English law |
| | Options | 2 | 0x0000 | No options specified |
| | Padding | 8 | | Spare |

Fig. 5b

| Eve's Creation of the Lease Contract | |
|---|---|
| EVE-S4-T1 | Transaction-ID |
| Version number | Version number |
| 1 | Number of inputs |
| <Eve's previous unspent BTC output - assume 500,000 satoshi> | Prev Trans Output |
| IDX-00 | Prev Trans Output Index |
| Script length | Script length |
| Sig-Eve PubK-Eve | ScriptSig |
| Sequence number | Sequence number |
| 2 | Number of outputs |
| 1,000 | Output value |
| Output script length | Output script length |
| OP_HASH160 <Redeem script hash> OP_EQUAL | Output script |
| 499,000 | Output value |
| Output script length | Output script length |
| OP_DUP OP_HASH160 <PubK-Eve Hash> OP_EQUALVERIFY OP_CHECKSIG | Output script |
| LockTime | LockTime |

Redeem Script: requires 2 out of Bob, Eve and the independent computing agent to unlock
OP_2 AssetMetaDataA AssetMetadataB PubK-Bob PubK-Eve PubK-Oracle OP_5 OP_CHECKMULTISIG

| Eve's Timelocked Roll-on of the Contract | |
|---|---|
| EVE-S4-T2 | Transaction-ID |
| Version number | Version number |
| 2 | Number of inputs |
| <Eve's mining fee of 1000 satoshi (note that no change can be given from this transaction) because of the effect of the timelock) which means that she'll probably generate a previous transaction to get an input of the exact value> | Prev Trans Output |
| IDX-00 | Prev Trans Output Index |
| Script length | Script length |
| Sig-Eve Sig-Bob OP_2 AssetMetaDataA AssetMetadataB PubK-Bob PubK-Eve OP_5 OP_CHECKMULTISIG | ScriptSig |
| Sequence number | Sequence number |
| 1 | Number of outputs |
| 1,000 | Output value |
| Output script length | Output script length |
| OP_HASH160 <redeem script hash> OP_EQUAL | Output script |
| Date when EVE-S4-T1 was transmitted plus 1 year | LockTime |

Redeem Script: requires 2 out of Bob, Eve's contract roll-on subkey and the independent Agent (oracle) to
OP_2 AssetMetaDataA AssetMetadataB PubK-Bob PubK-Eve SK1 PubK-Oracle OP_5 OP_CHECKMULTISIG
NOTE: Transaction is submitted ahead of time

Fig. 5c

After the first year, Bob continues with the lease and doesn't terminate. Immediately after EVE-S3-T2 is published then it is picked up by the Agent (oracle) and rolled-on for another year (note that it is also possible that this could be done by EVE using internal logic of her own)

| | Eve's Timelocked Roll-on of the Contract | |
|---|---|---|
| | EVE-S4-T3 | Transaction-ID |
| | Version number | Version number |
| | 2 | Number of inputs |
| | <Eve's mining fee of 1000 satochi (note that no change can be given from this transaction) because of the effect of the timelock) which means that she'll probably generate a previous transaction to get an input of the exact value> | Prev Trans Output |
| | IDX-00 | Prev Trans Output Index |
| | Script length | Script length |
| | Sig-Eve PubK-Eve | ScriptSig |
| | EVE-S4-T2 | Sequence number |
| | IDX-00 | Prev Trans Output Index |
| | Script length | Script length |
| | Sig-EveSK1 Sig-Oracle OP_2AssetMetaDataA AssetMetaDataB PubK-Bob PubK-EveSK1 PubK-Eve OP_5 OP_CHECKMULTISIG | ScriptSig |
| | Sequence number | Sequence number |
| | 1 | Number of outputs |
| | 1,000 | Output value |
| | Output script length | Output script length |
| Redeem Script: requires 2 out of Bob, Eve's second contract roll-on subkey and the independent Agent to unlock | | |
| OP_2AssetMetaDataA AssetMetadataB PubK-Bob PubK-EveSK2 PubK-Oracle OP_5 OP_CHECKMULTISIG | OP_HASH160 <redeem script hash> OP_EQUAL | Output script |
| NOTE: Transaction is submitted ahead of time | >>> Date when EVE-S4-T2 was transmitted plus 1 year | LockTime |

Fig. 5c (continued)

| Bob's Contract Termination | |
|---|---|
| BOB-S4-T1 | Transaction-ID |
| Version number | Version number |
| 2 | Number of inputs |
| <Bob's mining fee of 1000 satochi (note that no change can be given from this transaction) because of the effect of the timelock) which means that she'll probably generate a previous transaction to get an input of the exact value> | Prev Trans Output |
| IDX-00 | Prev Trans Output Index |
| Script length | Script length |
| Sig-Bob PubK-Bob | ScriptSig |
| EVE-S4-T2 | Sequence number |
| IDX-00 | Prev Trans Output Index |
| Script length | Script length |
| Sig-Bob Sig-Oracle OP_2AssetMetaDataA AssetMetadataB PubK-Bob PubK-EveSK1 PubK-Eve OP_3 OP_CHECKMULTISIG | ScriptSig |
| Sequence number | Sequence number |
| 1 | Number of outputs |
| 1,000 | Output value |
| Output script length | Output script length |
| OP_DUP OP_HASH160<PubK-Eve Hash>OP_EQUALVERIFY OP_CHECKSIG | Output script |
| LockTime | LockTime |

Fig. 5d

Scenario Definition
Bob: I am building a property, and I need two independent assessments at different times in the process (planning permission and building accreditation) before the contract is fulfilled House Base Metadata

| Field | Sub-field | Bytes | Value | Comments |
|---|---|---|---|---|
| Asset Metadata A | ContractType | 4 | 0x0000FF04 | Indicates unit |
| | ContractPointer | 16 | xxxx.xxxx.xxxx.xxxx (...) .xxxx | Address of the *Asset Definiton* file |
| | Padding | 12 | | Spare |
| Asset Metadata B | ContractHash | 20 | ###############... | Hash of the *Asset Definiton* file (not the tokenisation!) |
| | Juristiction | 2 | EN | Specifies that the asset is covered by English law |
| | Options | 2 | 0x0000 | No options specified |
| | Padding | 8 | | Spare |

Fig. 6b

| Bob's Creation of the Property Build Contract | |
|---|---|
| BOB-S5-T1 | Transaction-ID |
| Version number | Version number |
| 1 | Number of inputs |
| <Bob's previous unspent BTC output - assume 500,000 satoshi> | Prev Trans Output |
| IDX-00 | Prev Trans Output Index |
| Script length | Script length |
| Sig-Bob PubK Bob | ScriptSig |
| Sequence number | Sequence number |
| 2 | Number of outputs |
| 2,000 | Output value |
| Output script length | Output script length |
| OP_HASH160 <redeem script hash> OP_EQUAL | Output script >>>> Redeem Script: requires 2 out of Bob, Oracle to conclude OP_1 AssetMetaDataA AssetMetadataB PubK-Bob PubK-Oracle OP_4 OP_CHECKMULTISIG |
| 497,000 | Output value |
| Output script length | Output script length |
| OP_DUP OP_HASH160 <PubK-Bob Hash> OP_EQUALVERIFY OP_CHECKSIG | Output script |
| LockTime | LockTime |

Fig. 6c

| Bob's Creation of the sub-contract using his derived key to confirm planning approval | |
|---|---|
| BOB-SS-T2 | Transaction-ID |
| Version number | |
| | Number of inputs |
| 1 | |
| BOB-SS-T1 | Prev Trans Output |
| IDX-01 | Prev Trans Output Index |
| Script length | |
| Sig-Bob PubK Bob | ScriptSig |
| | Sequence number |
| | Number of outputs |
| 2 | |
| 2,000 | Output value |
| | Output script length |
| OP_HASH160 <redeem script hash> OP_EQUAL | Output script | Redeem Script; requires Planning Authority to approve & Oracle to approve, but Bob and stand-in for either >>>> OP_2 AssetMetaDataA AssetMetadataB PubK-BobSK1 PubK-PlanningAuthority PubK-Oracle OP_5 |
| 494,000 | Output value |
| | Output script length |
| OP_DUP OP_HASH160 <PubK-Bob Hash> OP_EQUALVERIFY OP_CHECKSIG | Output script |
| | LockTime |

Fig. 6c (continued)

| Bob's Creation of the sub-contract using his derived key to confirm building standard approval | |
|---|---|
| BOB-SS-T3 | Transaction-ID |
| Version number | Version number |
| 1 | Number of inputs |
| BOB-SS-T2 | Prev Trans Output |
| IDX-01 | Prev Trans Output Index |
| Script length | Script length |
| Sig-Bob PubK Bob | ScriptSig |
| Sequence number | Sequence number |
| 2 | Number of outputs |
| 2,000 | Output value |
| Output script length | Output script length |
| OP_HASH160 <redeem script hash> OP_EQUAL | Output script — Redeem Script: requires Building Standard to approve & Oracle to approve but Bob can stand-in for either >>>> OP_2 AssetMetaDataA AssetMetadataB PubK-BobSK2 PubK-BuildingStandard PubK-Oracle OP_5 |
| 491,000 | Output value |
| Output script length | Output script length |
| OP_DUP OP_HASH160 <PubK-Bob Hash> OP_EQUALVERIFY OP_CHECKSIG | Output script |
| LockTime | LockTime |

Fig. 6c (continued)

| Planning Authority Sign-off | |
|---|---|
| BOB-S5-T4 | Transaction-ID |
| Version number | Version number |
| 1 | Number of inputs |
| BOB-S5-T2 | Prev Trans Output |
| IDX-00 | Prev Trans Output Index |
| Script length | Script length |
| Sig-PlanningAuthority Sig-Oracle OP_2 AssetMetaDataA AssetMetadateB PubK-BobSK1 PubK-PlanningAuthority PubK-Oracle OP_5 OP_CHECKMULTISIG | ScriptSig |
| Sequence number | Sequence number |
| 1 | Number of outputs |
| 1,000 | Output value |
| Output script length | Output script length |
| OP_DUP OP_HASH160 <PubK-PlanningAuthority Hash> OP_EQUALVERIFY OP_CHECKSIG | Output script |
| | Note |
| | <<<< The satochi pays the planning authority fee (note that there maybe a two output model for both the oracle and planning authority) |
| LockTime | LockTime |

Fig. 6d

REGISTRY AND AUTOMATED MANAGEMENT METHOD FOR BLOCKCHAIN-ENFORCED SMART CONTRACTS

This invention relates generally to computer protocols and, more particularly, to the verification, enforcement and/or performance of condition controlled processes such as, for example, those relating to contracts. The invention is particularly suited for use with a blockchain network, and may be used to advantage with a smart contract.

A blockchain is a decentralised, distributed computer system made up of unchangeable blocks which in turn are made up of transactions. Each block contains a hash of the previous block so that blocks become chained together to create a record of all transactions which have been written to the blockchain since its inception. Transactions contain small programs known as scripts embedded into its inputs and outputs, which specify how and by whom the outputs of the transaction can be accessed. Each unspent transaction (referred to as UTXO) can be spent as an input into a new transaction.

The most widely known application of block chain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations fall within the scope of the invention.

Blockchain technology is known for the use of cryptocurrency implementation. However, in more recent times, digital entrepreneurs have begun exploring both the use of the cryptographic security system Bitcoin is based on, and the data that can be stored on the Blockchain, to implement new systems. These include but are not limited to:

Storing metadata
Implementing digital tokens
Implementing and managing contracts.

One of the key problems with modern contract management is that it tends to be ad-hoc, with local stores and copies of contracts that are manually maintained. As a result, computer protocols known as "smart contracts" have begun to attract attention as they can enable the automated enforcement or performance of a contract, either partially or in its entirety. Smart contracts can provide benefits such as enhanced security and reduced transactions costs. However, while there are known technical solutions which aim to ensure that these contracts cannot be modified once stored, there is no generally accepted public registry to check the validity of the contract i.e. whether it is still open or has been terminated.

Thus, it is desirable to provide a computer-implemented mechanism which can control public visibility of the existence of a contract, and facilitate the ability of relevant parties to manage, enforce and maintain performance-based processes such as contracts in an automated manner (i.e. by machine rather than human management). Importantly, this mechanism would provide a technical ability to specify control conditions and triggers for behaviours defined within the contract.

It should be noted that the invention defined and described herein is not limited for use with contracts in the legal sense of the word. The contract may be a document, file or other mechanism which defines a set of behaviour(s) that can be triggered under specified conditions. The control condition may be publically fulfilled. The invention should not be regarded as being limited to use within legal or commercially-oriented contexts, and the term 'contract' should not be construed in such a limiting sense. For example, the contract may be a ticket for a train or airline, or for a concert venue, and on which is printed an access code such as a machine readable barcode for providing unlocking a barrier.

Thus, an invention is provided herein as defined in the appended claims.

According to an aspect of the present invention, there is provided a computer-implemented method of controlling the visibility and/or performance of a contract, the method comprising the steps:

(a) storing a contract on or in a computer-based repository;
(b) broadcasting a transaction to a blockchain, the transaction comprising:
   i) at least one unspent output (UTXO); and
   ii) metadata comprising an identifier indicative of the location where the contract is stored; and
(c) renewing or rolling the contract on by:
   generating a new key using data relating to a previous key associated with the contract;
   generating a script comprising the new key, the location of the contract and a hash of the contract; and
   paying an amount of currency to the script.

By renewing or rolling the contract on by generating a new key using data relating to a previous key associated with the contract, generating a script comprising the new key, the location of the contract and a hash of the contract, and paying an amount of currency to the script, this provides the advantage that because the new key is related to the previous key, authorised parties can view the source contract by means of its connection with the renewed or rolled on contract, thereby enabling verification of the rolled on contract, without any loss of certainty or privacy. The further advantage is provided that memory and processing capacity can be reduced by storing the contract in a computer-based off-chain repository (i.e. not forming part of the blockchain), without loss of certainty or privacy, since the key associated with the renewed or rolled on contract is associated with the key of the source contract.

In the 'rollover' situation, the UTXO may be spent sending it to the 'new' rolled-on contract. However, it may be possible to cancel the existing contract by spending the output before the lock time and thus cancelling the whole contract.

The invention may provide a computer-implemented method and system for controlling the visibility and/or performance of a contract. 'Visibility' may mean how and to whom the existence and/or contents of the contract are available or accessible. The contract may be a 'smart contract'. The method may be an automated smart contract method. It may be a method for automating the process of monitoring the existence, validity and/or performance of the contract. As the contract may be represented in the form of at least part of a blockchain transaction, the invention may be referred to as a tokenisation method/system. The metadata in the transaction may provide a blockchain-implemented token which is used to represent and/or access a contract.

The invention may provide a method/system which enables the storage of a contract in a repository (registry), where a hash of the contract can be used as a look-up key for finding the contract.

The method may comprise the steps:
   storing a contract on or in a computer-based repository; and broadcasting a transaction to a blockchain, the transaction comprising:
  i) at least one unspent output (UTXO); and
  ii) metadata comprising an identifier indicative of the location where the contract is stored.

The contract may be interpreted as open or valid until the UTXO is spent on the blockchain. The blockchain may or may not be the Bitcoin blockchain. This provides the benefit of a novel mechanism for representing the status or validity of a contract on a blockchain as represented by the UTXO.

The method may comprise the step of using an off-chain computer-implemented process, agent or other entity to observe the state of the blockchain and behave a certain way based on whether or not the output is currently unspent. The process may be arranged to interpret the unspent output as an indicator of the status of the contract. In other words, while the output remains within the UTXO list on the blockchain i.e. the transaction is still unspent, this may be used to indicate the validity or 'open' status of the contract pointed to or referred by the metadata. The contract may be considered to be complete (terminated) once the UTXO is spent. This condition may be stated within the contract. However, once the UTXO has been spent the metadata may continue to contain a pointer or reference to the contract and a hash of the contract so the contract may retain its function.

The method may comprise the step of publishing the existence of the contract. This may be achieved by the following steps:

The Contract Issuer may create a new Contract Document and publish this to the Repository. The location of the store and the secure hash of that document may be stored for later use;

creating a redeem script covering the contract document being secured, in a m of n multi-signature structure where:
  m is at least one; and
  n is m plus the number of metadata blocks
including at least one public key in the script; this may be the public key of the Contract Issuer. However, other signatures may be required as well paying an amount of currency e.g. Bitcoin to the script, preferably through a P2SH transaction waiting until the transaction has been published onto the Blockchain and extracting the transaction ID for the published transaction creating a new transaction, with a locktime set to the expiry time of the contract, paying the output from the transaction back to the public key hash; OR For a rolling duration contract: using an automated computing agent to detect the transaction on the blockchain and wait until the contract expiry time before triggering code to roll it into a new contract; OR For a completion-based contract (where x of y entities agree that the contract has been fulfilled): creating a m of n multi-signature transaction and issuing it to these entities to co-sign upon completion.

The repository may be an off-block storage resource. In other words, the repository may not form part of the blockchain itself. The computer-based repository may be or comprise a server. The repository may be a database or other storage facility provided on a computer-based resource. The Repository may be indexed, allowing it to be searched. The repository may comprise a Distributed Hash Table. The contract may be stored in or in association with the Distributed Hash Table (DHT).

The transaction may further comprise a deterministic redeem or locking script address. The address may be a pay-to-script-hash (P2SH) address. Thus, the existence of a contract (or defined element within a contract) may be made publicly available using a transaction which is published to the blockchain using a pay-to-script-hash address which may be determined or provided by the issuer of the contract; and/or the metadata of the contract.

The method may further comprise the step of terminating the contract by broadcasting a (further) transaction to the blockchain to spend the output (UTXO). The further transaction may comprise an input which is the output (UTXO); and an unlocking script comprising a signature; the metadata; and a public key.

This may provide the benefit of automated termination of the contract, via the use of a blockchain transaction to spend the output.

The contract may define: i) at least one condition; and ii) at least one action whose performance is dependent upon the evaluation of the condition. The condition may be a test which can be evaluated to true or false. The condition may be part of (eg a clause) the contract. Completion or performance of the condition may be required for fulfilment of the contract. The condition may be completed if it evaluates to true.

The metadata may comprise i) an address or representation of an address of where the contract is stored in the computer-based repository; and/or ii) a hash of the contract.

The method may comprise the step of observing the blochchain state. It may comprise searching the blockchain to find a transaction containing the UTXO. It may comprise the step of checking whether the contract has been terminated by determining whether the unspent transaction UTXO is in the list of unspent transaction outputs for the blockchain. This monitoring or checking process may be automated. It may be performed by a suitably programmed computing agent or resource. It may be substantially as described below in the section entitled "Illustrative Computing Agent for use with the invention". The agent may perform an action based upon the spent or unspent status of the UTXO. Thus, the status of the UTXO may control or influence the behaviour of an off-block computing agent.

The method may comprise the step of broadcasting a transaction to the blockchain comprising an instruction to spend the output at a specified date and/or time. The instruction may be a CheckLockTimeVerify instruction.

Access to some or all of the contents of the contract may be restricted to at least one designated authorised party. In other words, authorisation may be required in order to access or view some or all of the contract. In some embodiments, protection mechanisms may be applied to the contract itself. For example, one or more portions of the file may be protected but the overall content may be public. This partial protection may apply to both the encryption of the information within the contract as well as the hash detecting changes to its content.

The contract may comprise a Deterministic Finite Automaton (DFA) to implement the contract. The Deterministic Finite Automaton may be defined using a codification scheme. The Deterministic Finite Automaton may be implemented using:
  i) at least one blockchain transaction, preferably using a scripting language;
  ii) a computing agent arranged to monitor the state of the blockchain (this may be as described in the section below entitled "Illustrative Computing Agent for use with the invention"); and/or
  iii) a set of instructions for a digital wallet.

According to another aspect of the present invention, there is provided a computer implemented method of controlling the visibility and/or performance of a contract, the method comprising the steps:

(a) storing a contract on or in a computer-based repository;
(b) broadcasting a transaction to a blockchain, the transaction comprising:
   i) at least one unspent output (UTXO); and
   ii) metadata comprising an identifier indicative of the location where the contract is stored; and
(c) generating a sub-contract derived from the contract, wherein the sub-contract is associated with a deterministic address and is generated by:
   iii) using a new public key derived using a seed;
   iv) storing the sub-contract in or on the repository with a reference to the contract, and broadcasting a transaction to the blockchain comprising a script which includes the reference; and/or
   v) adding a reference to the sub-contract to the metadata of the existing contract.

By generating a sub-contract derived from the contract, wherein the sub-contract is associated with a deterministic address and is generated by using a new public key derived using a seed, storing the sub-contract in or on the repository with a reference to the contract, and broadcasting a transaction to the blockchain comprising a script which includes the reference and/or adding a reference to the sub-contract to the metadata of the existing contract, this provides the advantage that sub-contracts can be independently managed without loss of certainty or privacy, since they are cryptographically bound to the source contract. In addition, memory and processing resources can be minimised by storing the sub-contract in an off-block repository.

The method may include the use of a computer-based agent to monitor the blockchain and/or execute actions based on the content of contract. Such an agent may be substantially as described below in the section entitled "Illustrative Computing Agent for use with the invention".

The invention may also provide a computer-implemented system arranged to perform any of the method steps mentioned above, or any embodiment of the method described herein. The invention may provide a computer-implemented system for controlling the visibility and/or performance of a contract, the system comprising:

a computer-based repository arranged to store a contract; and
a blockchain comprising a transaction, the transaction comprising:
   i) at least one unspent output (UTXO); and
   ii) metadata comprising an identifier representing the location where the contract is stored.

The metadata may also store a hash of the contract. The contract may be a smart contract.

The repository may comprise a database. It may comprise a DHT. It may be indexed. searchable. It may comprise at least one security mechanism to control access to the contract.

The system may also comprise a suitably configured computing-based entity or agent. The agent may be arranged to monitor and/or search the blockchain. It may be arranged to perform at least one action based upon the state of the blockchain. It may be arranged to determine whether the UTXO has been spent or not. It may be arranged to perform one or more actions based on whether or not the UTXO has been spent.

Any feature described herein in relation to one embodiment or aspect may also be used in relation to any other embodiment or aspect. For example, any feature described in relation to the method may also be used in relation to the system and vice versa.

A non-exhaustive list of some of the benefits which may be provided by the invention is now provided.

The invention may provide a technical arrangement which simplifies the automated management of structured control conditions, which may be referred to as "contracts" herein. This, in turn, makes it easier to agree the state of the contract in the event of a dispute. The invention may also provide a mechanism to hold a secure, public record of contracts in a manner which allows automated determination of their validity by computer, and release of their details to authorised entities upon validation. Thus, the invention may provide a security-enhanced control mechanism which permits or prohibits access to a resource in an intelligent manner.

The invention also provides the ability to publish a contract to an audience via a computer system such that the details of the contract can be restricted to authorised entities only, but the knowledge of the existence of the contract is publically known. In other words, it can be public knowledge that there is a contract between A and B, and this can be publicly verified, but anything other than its existence is restricted to authorised parties (which might typically be A and B only).

It also provides a computer-implemented mechanism that allows contracts to be time-bound (i.e. they expire after a certain time or on a given date); condition bound (i.e. they expire once the deliverable specified within the contract has been fulfilled) or open-ended (i.e. they continue to roll on with a notice period to terminate them).

It may provide a mechanism to serve notice to terminate that contract in a public fashion. For example, using nLockTime+CheckLockTimeVerify (CLTV) in a spend transaction to 'enact' the expiration.

It may provide a mechanism to structure a hierarchy of sub-contracts in a deterministic manner to allow control over different aspects of the contract to be partitioned. For example, in a technology development process the requirements phase may have a different set of control triggers than the development phase.

As the invention may be implemented on a blockchain platform, and may extend the functionality of the blockchain so that it can be used in a technically different way, the invention may provide an improved blockchain system or platform.

The invention may be used to turn any unspent transaction (UTXO) into a smart contract, such as for digital access. For example, consider a scenario wherein a consumer pays a merchant for access to a service for a period of time. If the merchant's payment address is implemented as a smart contract, then the invention can be used to implement an access control mechanism for the service. A check can be made to ensure that the money has been paid, and an automated process used to sweep the value at the end of the period to the merchant's account.

These and other aspects of the present invention will be apparent from and elucidated with reference to, the embodiment described herein. An embodiment of the present invention will now be described, by way of example only, and with reference to the accompanying drawings, in which:

FIG. 2a shows a simple state machine with two states: (i) contract is open and (ii) contract is closed.

FIG. 2b shows metadata definition for the scenario of FIG. 2a. The metadata is carried on the (bitcoin) transaction output and which specifies the contract location and proof of validity (via the hash).

FIG. 2c shows an 'issuance' transaction related to the scenario of FIGS. 2a and 2b, that initially stores the (hash of the) contract on the Blockchain.

FIG. 2d cancels the contract of FIGS. 2a to 2c by spending the bitcoin.

FIG. 3a shows an illustrative metadata for a scenario wherein an asset with hidden ownership is created and published to the blockchain.

FIG. 3b shows an illustrative transaction to 'fund' the asset of FIG. 3a. That is, to put some bitcoins into the asset's public key so that the asset can fund its transactions (such as the publication transaction shown in 3c).

FIG. 3c shows an illustrative blockchain transaction for the publication of the asset of FIGS. 3a and 3b.

FIG. 3d shows an illustrative transaction for closure of the contract relating to FIGS. 3a, b and c. When cancellation of the contract is required, the UTXO is spent. In this scenario, the requirement has been for both the Asset and the hidden owner of the asset to sign.

FIG. 4a shows an illustrative state machine model for a scenario involving a lease contract.

FIG. 4b shows an illustrative metadata for the scenario of FIG. 4a.

FIG. 4c shows an illustrative transaction to publish the ownership of the asset of FIGS. 4a and 4b onto the Blockchain.

FIG. 5a shows an illustrative state machine model for a scenario wherein a contract is rolled on.

FIG. 5b shows an illustrative metadata for the scenario of FIG. 5a.

FIG. 5c shows an illustrative transaction which could be used to publish the initial contract of FIGS. 5a and 5b and the initial rollover of the contract onto the Blockchain.

FIG. 5d shows an illustrative transaction for the termination of the contract of FIGS. 5a to 5d.

Figure 6A:
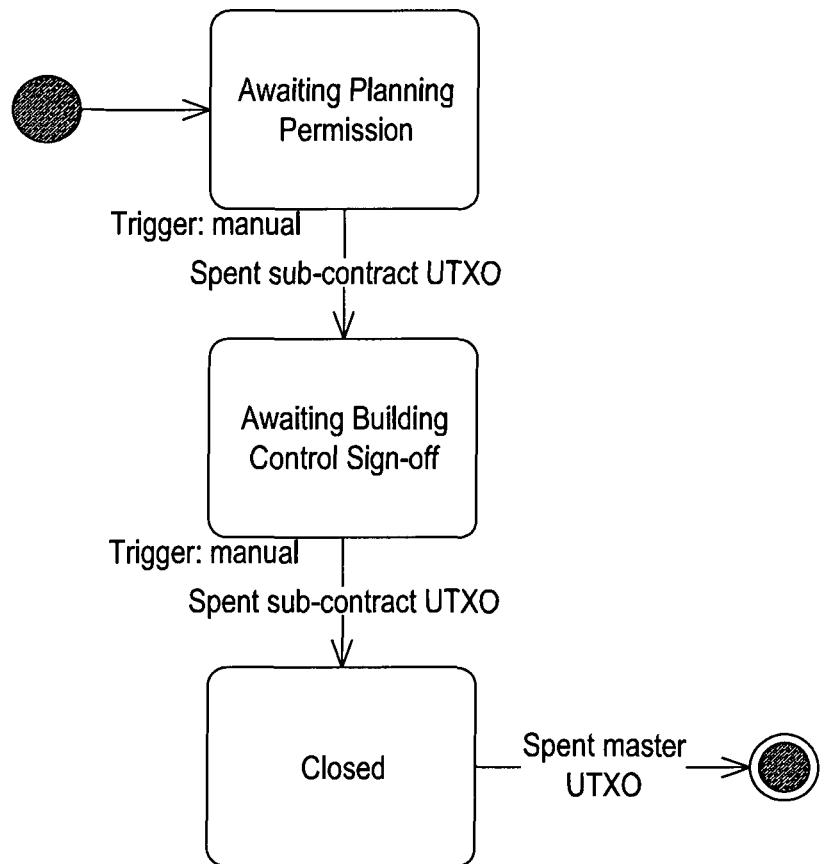

FIG. 6a an illustrative state machine model for a scenario involving contract conditionality.

FIG. 6b shows an illustrative metadata for the scenario of FIG. 6a.

FIG. 6c shows an illustrative transaction which could be used to create the initial contract and two sub-contracts and publish them.

FIG. 6d shows an illustrative transaction for use in relation to the scenario of 6a to 6c.

FIGS. 7 to 13 show various aspects of a technique for deriving sub-keys from a parent key, this technique being suitable for use in relation to aspects of the present invention.

Smart contracts built into the Blockchain can be enforced through logic which is embedded directly into the bitcoin transaction (i.e. within the locking/unlocking scripts) and/or through external computer-based applications. Such external computer-based applications which may be referred to as 'agents', 'oracles' or 'bots'. In addition, some contractual conditions can be enforced through other bitcoin transaction elements such as the nLockTime field.

An invention is described herein where the contract is interpreted as remaining in effect as long as there is a valid unspent transaction output UTXO on the blockchain representing the contract. It will be appreciated that this unspent state can be influenced and altered as a result of various mechanisms (e.g. a programmed computing agent) whose behaviour is controlled by conditions or stipulations in the contract itself. For example, the contract stipulates that it will expire on a certain date, or that it will expire when a certain value reaches a specified threshold.

This principle of using unspent transaction outputs to represent contracts can be used in combination with other features, such as encryption techniques. This allows the implementation of complex scenarios and activities. Effectively, the context around the unsigned transaction output UTXO and the associated metadata within the script that enables it to be spent, allows the transaction to act as a pointer or reference to an off-chain repository which contains the formal details of the contract. Herein, 'off-chain' means that it is not part of the blockchain itself. This provides a mechanism whereby anyone can use a software-based component or tool to determine whether the contract has been terminated or is still valid/open by inspecting the blockchain. Once the contract is terminated, this will be recorded on the blockchain as a spent output in a transaction and this available for public inspection. The blockchain transaction becomes a permanent, unalterable and public record of the contract's existence and current status.

The repository (which may also be called a 'registry' or 'register') may be implemented in a variety of ways including, for example, as a distributed hash table (DHT). A hash of the contract can be generated and stored as metadata within the blockchain transaction, and can serve as the look-up key for referencing the contract from the blockchain. A reference to the location of the contract is also provided within the transaction metadata. For example, the URL for the repository may be provided. While the metadata is open to public view, the contract itself may not be, or may be partially protected.

Standard Bitcoin features such as CheckLockTimeVerify (CLTV) can allow the contract to have a formal, automated expiry at a point in the future. Use of the blockchain enables this expiry date to be a matter of secure (unalterable) public record. This concept, in combination with the use of multiple encryption keys described below, enables the CLTV model to automatically roll-on or renew the contract unless explicitly cancelled.

The use of deterministic sub-keys, in combination with the tokenisation mechanism described herein, allows sub-contracts or schedules against contracts to be created.

Further still, the use of off-block computing agents (oracles) allows contract conditionality to be built in and modified by trusted third-parties. This means that the agent's action can be influenced by conditions (eg "IF" statements) which are provided within the contract definition.

Key Terms

The following terms may be used herein.

Contract issuer:
This entity represents an actor that is responsible for the publication of the contract onto the Blockchain Interested party:
This entity represents an actor that may need to determine whether a particular contract is still in place or not, or may need to determine the specifics of the contract.

Repository:
This entity represents a location which secures/stores a structured representation of the contract that the Blockchain smart contract references;

Contract counterparty:
This entity represents the counterparty to a specific contract. Note that in many cases, this entity will not be present Contract:

This is the structured document or file stored within the repository and which is referenced from the Blockchain. The contract can be any type of contract or agreement. This may include, for example, financial contracts, title deeds, service contracts and more. A contract can be public or private in terms of its content. The contract is formalised in that it is expressed in a structured manner using a codification scheme.

Contract Model

The basic elements of the contract model are as follows:

A codification scheme that allows a complete description of any type of contract. The scheme may be a new construct or may use an existing facility such as XBRL, XML, JSON (etc.);

A DFA (Deterministic Finite Automaton) to implement the Contract that can be fully defined within the codification scheme. This is made up of:
  A set of parameters, and where to source those parameters;
  A set of state definitions
  A set of transitions between the states, including the trigger for the transition and the rules followed during the transition.
  Rules definition table Definitions of the specific parameters for this instance of the Contract;

Mechanisms to secure and protect the Contract;

A 'browser' to enable the contact to be made human-readable in formal legal language; and A 'complier' to convert the codification scheme into oracle code and/or a script such as a Bitcoin script.

Implementing the Contract

When the Contract is registered in a repository, the associated address e.g. URL and hash can be used as metadata within a Blockchain transaction to associate the transaction on the chain with the controlling contract itself. This can be implemented in a variety of forms, but a suitable codification scheme is provided below for completeness in the section entitled "codification Scheme".

There are a number of different methods as to how the DFA contained within the contract definition can be implemented:

As a Blockchain transaction or sequence of transactions. Various forms of DFA may be implemented directly within the Bitcoin scripting language; the person skilled in the art will understand this and the present invention is not limited with regard to the manner in which the DFA is implemented via blockchain transaction(s);

As an agent-based (e.g. oracle) process or sequence of processes. The section below entitled "Illustrative Computing Agent for use with the invention" describes the basic process for defining and running a suitable agent to monitor the Blockchain and possibly other external sources.

As a set of instructions for a smart Wallet. In this content, a smart wallet is effectively simply a local oracle process which can handle certain contract conditions such as assignment of transaction inputs to a Blockchain transaction.

Note that a given contract definition can be implemented as a mixture of the above three mechanisms, where each contract state transition is effectively a separate implementation. There are a number of methods of creating the implementation from a contract definition, including hand-crafting the relevant transactions/code.

Publishing the Contract's Existence

In order to publish the existence of a contract (or a defined element within a contract) a transaction Tx is published to the Blockchain using a pay-to-script-hash address (P2SH). A P2SH transaction is one in which the recipient must provide a script which matches the script hash, and also data which makes the script evaluate to true, in order for the transaction to be spent. In relation to embodiments of the present invention, the pay-to-script-hash (P2SH) can be readily determined from:

The issuer of the contract; and
The metadata of the contract.

In accordance with some embodiments of the invention, the unspent transaction can be interpreted as an indicator of the status of the contract. An off-chain process can be arranged to monitor the blockchain and behave a certain way based on whether or not the output is unspent. In other words, while this output remains within the UTXO list on the blockchain (i.e. the transaction is still unspent), this indicates the validity of the contract pointed or referred to by the metadata. The contract is considered to be complete once this output is spent. This condition (that the contract remains valid/open only as long as a UTXO exists for it) can be a condition of the contract itself. However, it is not a necessary stipulation of the protocol as in other embodiments an alternative termination condition may be in place. Note that even after the transaction has been spent (and therefore no longer exists in the UTXO list) it still resides permanently on the Blockchain and still retains a pointer or reference to the contract and a hash of the contract so it could retain its function even after being spent.

Sub-Contracts/Conditions

A sub-contract is a contract that it directly related to an existing contract. A condition is a clause within an existing contract that must be fulfilled to meet the terms of that contract.

In accordance with an embodiment of the invention, both sub-contracts and conditions can be implemented in the same manner i.e. as a contract which is implemented as an UTXO with a deterministic redeem script address. In both cases, the entity can be interpreted as being complete when the UTXO is spent (in the case of a condition, this indicates that the condition has been satisfied). As stated above, the metadata will still contain a pointer or reference to the location of the entity within the repository, and also a hash of it. Therefore, in other embodiments, the sub-contract or condition may remain in existence and retain functionality even after the output has been spent, depending on the contractually specified conditions.

There are a number of mechanisms which can be used to create the deterministic address for a condition or sub-contract:

deriving a new public key using seed information;
Creating and publishing the sub-contract, with a reference to the master contract, within the repository and using this as the metadata reference; and
Adding the condition/sub-contract reference to the metadata of the existing contract.

Securing the Contract

The formal representation of the contract (ie the document or file which specifies the content of the contract) can be secured in various ways depending on the formal needs of that specific contract, although in all cases a public record of the existence of the contract will be published on the Blockchain contained within the metadata record (see section entitled "codification Scheme" for details of a specific metadata structure).

From this blockchain record, authorised entities will be able to learn the location of the formal representation, together with the hash to determine that the formal representation has not been modified since the transaction was published.

However, it is possible to further secure the formal representation itself through a number of methods:

The document repository itself can present access control mechanisms; and

The Contract itself can be secured through standard encryption techniques limiting access to those entities with access to the relevant decryption keys.

In many cases, the Contract itself will have partial protection on it. For example, some sections within the file might be protected while the overall content is public e.g. the details of how to implement a fixed rate loan are published but the knowledge of who took out the loan, for how much and at what rate is known only to the contracting parties.

This partial protection applies to both the encryption of the information within the contract as well as the hash detecting changes to its content.

For a number of contracts, the details of the contract can be amended over its life and this should not require the re-issuance of the contract itself. This can be achieved by determining the scope of the hash over a sub-set of the contract. An example where this might be useful is on the implementation of a unit trust. The contract underpinning the unit trust may not change, but beneficiary for the unit can be amended through on-sell of the contract. In one embodiment, recording the changes can be achieved using subcontracts.

Terminating the Contract

As the Blockchain provides a permanent, unalterable record of transactions, a contract cannot be terminated by simply removing the associated Contract document. This means that the secure contract repository must have the same storage and retention rules as the Blockchain itself which is supported through a number of standard mechanisms. This means that the solution must present a mechanism for detecting the expiry of a contract through the Blockchain record directly.

The method of termination is defined as a condition in the contract and can be effected in a variety of ways, all of which are conceptually covered by the present invention. In a preferred embodiment of the invention, termination is handled through the spending of the UTXO that represents the contract.

For a number of contract types, the expiry of the contract can be published simultaneously with the publication of the Contract itself. Effectively two transactions are created, one to publish the contract and get the transaction output representing the contract and a second one to spend that output. This second transaction has a CheckLockTimeVerify set on it to spend the output on a given future date (representing the end of the contract). As per previous comment this is our standard way but not the only way.

This auto-spending can be extended to support the rolling-on of a contract (for example contracts that automatically extend for a further twelve months if they are not cancelled). In this situation, the UTXO is spent sending it to the 'new' rolled-on contract. However, it is possible to cancel the old one by spending the output before the lock time and thus cancelling the whole contract.

Use Case Model

Figure 1:
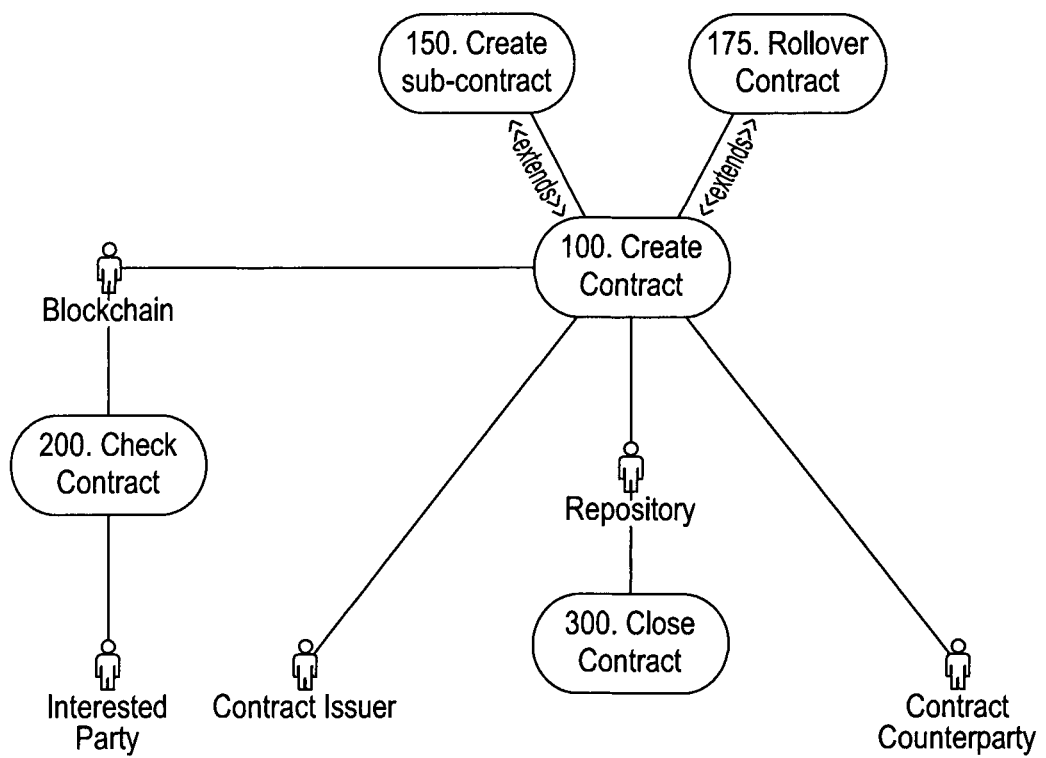
FIG. 1 shows an overview of how blockchain transactions can be used by an embodiment of the invention to implement various contract-related tasks.

FIG. 1 shows an overview of a use case model in accordance with an embodiment of the invention. This illustrative use case model demonstrates how standard Bitcoin transactions can be used to implement elements of the DFA directly within Bitcoin scripts. Examples of key use cases are now provided for the purpose of illustration.

Creating the Contract

The Contract Issuer (who is the primary actor in this example) wishes to publish a contract onto the Blockchain for public visibility. This process is outlined in Table 1:

| Step | Details |
|---|---|
| 100.10 | The Contract Issuer creates a new Contract Document and publishes this to a Repository, storing the location of the store and the secure hash of that document for later use. Note that this Repository can be public, private or semi-private depending on the nature of the Contract Document itself. The Repository is indexed allowing it to be searched by a variety of attributes. |
| 100.20 | The Contract Issuer creates a redeem script covering the contract document being secured, in a m of n multi-signature structure where:<br>m is at least one; and<br>n is m plus the number of metadata blocks (which will be at least two).<br>The one public key that must always be supplied to this script is that of the Contract Issuer. However, depending on the terms of the contract other signatures may be required as well. |
| 100.30 | The Contract Issuer pays a nominal amount of currency e.g. Bitcoin to the redeem script calculated in step 100.20 through a standard P2SH transaction. |
| 100.40 | The Contract Issuer waits until the transaction has been published onto the Blockchain and extracts the transaction ID for the published transaction. |
| 100.50 | For a fixed duration contract, the Contract Issuer then creates a new transaction, with a locktime set to the expiry time of the contract, paying the output from step 100.40 back to the Contract Issuer's public key hash.<br>For a rolling duration contract, a computer-based agent can pick up the transaction and wait until the contract expiry time before triggering the 'rollover' use case of table 3 below to roll it onto the contract.<br>For a completion-based contract (where x of y entities agree that the contract has been fulfilled), a m of n multi-signature transaction is created and issued to these entities to co-sign upon completion). |

There are two key embodiments or variations to this scenario which are explained in detail below:

Creating a sub-contract from an existing contract

Rolling an existing contract over into a new one (renewing it)

Creating a Sub-Contract

In this situation, the Contract Issuer wishes to create a sub-contract from an existing contract. This process is outlined in Table 2:

| Step | Details |
|---|---|
| 150.10 | The Contract Issuer creates a new sub-key from their public key used to create the parent contract using a seed value in the derivation of the sub-key information from the parent contract. This can be any derivation that the Contract Issuer wishes (and has committed to), but examples of appropriate seeds could include:<br>Transaction ID/index of the contract UTXO created in step 100.40; or<br>Redeem script hash created in step 100.20.<br>It should be noted that this example assumes that the public key referred to above would be the Contract Issuer's public key; however, the skilled person will appreciate that there is nothing to prevent this being the derived sub-key (i.e. a sub-contract of a sub-contract). |
| 150.20 | Depending on the nature of the sub-contract being created, the Contract Issuer either:<br>Uses the location and hash of the master contract document; or<br>Creates a new Contract Document with a link to the master embedded within it, storing the location of the document and secure hash of that document for later use; or<br>Creates a new Contract Document with a link to the master embedded within it, plus a list of the fields from the original Contract Document that is covered. Effectively, this is a document which specifies that this sub-contract covers specific sections of another document rather than duplicating the original information.<br>Note that this Repository can be public, private or semi-private depending on the nature of the Contract document itself. |
| 150.30 | The Contract Issuer creates a redeem script covering the contract document being secured, in a m of n multi-signature structure where:<br>m is at least one; and<br>n is m plus the number of metadata blocks (which will be at least two).<br>The one public key that must always be supplied to this script is that of the Contract Issuer. However, depending on the terms of the contract other signatures may be required as well. |
| 150.40 | The Contract Issuer pays a nominal amount of currency e.g. Bitcoin to the redeem script calculated in step 150.30 through a standard P2SH (pay-to-script-hash) transaction. |
| 150.50 | The Contract Issuer waits until the transaction has been published onto the Blockchain and extracts the transaction ID for the published transaction. |
| 150.60 | For a fixed duration sub-contract, the Contract Issuer then creates a new transaction, with a locktime set to the expiry time of the contract, paying the output from step 150.50 back to the Contract Issuer's public key hash. |

According to one or more embodiments, the sub-contract may be independently monitored. For example, consider a property build contract where a sign-off from a surveyor is required and the contract states 'subject to sign-off by <x>'. To implement this, step 150.60 is created and circulated to <x> to sign. The repay script is not time locked but created as a m of n multi-signature element where the required signatory is <x>. In some embodiments, the transaction will have two outputs: the fee to <x> plus the payment of the UTXO generated in step 150.50.

Example Use Case: Roll-Over Existing Contract

In this use case, the Contract Issuer wishes to rollover an existing contract into a new one. An illustrative process if provided in table 3:

| Step | Details |
|---|---|
| 175.10 | The Contract Issuer will check the Blockchain to determine whether the contract has been cancelled or not by validating whether the previous UTXO has been spent or not. If it has been spent, the process ends. |
| 175.20 | The Contract Issuer creates a new sub-key from their public key used to create the parent contract and using it as a seed value in the derivation of the sub-key information from the parent contract sequence. This can be any deterministic derivation that the Contract Issuer wishes (and has committed to), but could be:<br>Sequence number (e.g. rolled over instance '1'); or<br>Date range for the rolled-over contract<br>The above assumes that the public key mentioned above would be the Contract Issuer's public key, but in practice there is nothing to prevent this being a derived sub-key (i.e. a sub-contract of a sub-contract). See section entitled "Method of sub-key generation" for an example of how the sub-key can be created. |
| 175.30 | The Contract Issuer takes the location and hash of the existing contract document. Note that this Repository can be public, private or semi-private depending on the nature of the Contract Document itself. |
| 175.40 | The Contract Issuer creates a redeem script covering the contract document being secured, in a m of n multi-signature structure where:<br>m is at least one; and<br>n is m plus the number of metadata blocks (which will be at least two).<br>The two public keys that must always be supplied to this script is that of the Contract Issuer and the Customer. However, depending on the terms of the contract other signatures may be required as well. |
| 175.50 | The Contract Issuer pays a nominal amount of Bitcoin to the redeem script calculated in step 175.40 through a standard P2SH transaction. |

| Step | Details |
|---|---|
| 175.60 | The Contract Issuer waits until the transaction has been published onto the Blockchain and extracts the transaction ID for the published transaction. |
| 175.70 | A process (such as a bot or oracle-based implementation) will pick up the transaction and wait until the contract expiry time before re-triggering the 'roll over' process of table 3 to roll it on again if it has not been cancelled. |

Example: Checking the Contract

In this use case, an Interested Party wishes to confirm that there is a contract in existence to cover the activity that (s)he is enquiring about. Such a process is shown in table 4:

| Step | Details |
|---|---|
| 200.10 | The Interested Party will check the Blockchain to confirm whether the UTXO relating to the contract they are interested in has been spent or not. Where the UTXO is still unspent, then the contract remains valid. Where the UTXO is still unspent, but there is a locktime transaction pending, then this will determine the expiry time for the contract. Where the UTXO is spent, then the contract has been completed in some regard. |

The main variable above assumes that the Interested Party is aware of the transaction that governs the contract through some other route (in general, that is that they are either the Contract Issuer or the Contract Counterparty). However, any entity that has access to the Contract Document and knowledge of the Contract Issuer will be able to check by:

Deriving the redeem script for the UTXO transaction; and
Scanning the Blockchain to find a UTXO with that matching redeem script hash.

Example: Closing the Contract

In this use case, a Contract Issuer or Contract Counterparty wishes to close an existing contract. This process is illustrated in table 5:

| Step | Details |
|---|---|
| 300.10 | The instigator of the closure will check the blockchain to determine whether the contract has been cancelled or not by validating whether the previous UTXO has been spent or not. If it has been spent, the process ends as the contract has already been closed. |
| 300.20 | If there is an existing closure transaction, then the instigator will simply sign this transaction and submit onto the Blockchain |
| 300.30 | If there is not an existing closure transaction, then the instigator will create the transaction with the transaction input being the UTXO of the last contract, and the unlock script being their signature, the meta data associated with the contract and their public key. |
| 300.40 | At the point that the transaction is accepted onto the Blockchain then it will be public knowledge that the contract has been closed (although only the participants will know the specific reason why). |

Contract Conditions

The same mechanism described above can be used to monitor conditions within a given contract, such as checkpoints. For example, if a contract is determined to be worth 100 BTC, with 20 BTC to be paid at checkpoint 1 through 5, then the sub-contract model described above can be used to derive a master contract plus five sub-contracts. Each of these sub-contracts can be marked as complete using the same, or different, signatories (such as notaries or similar, for example). In this manner, a public record can be maintained, showing that the conditions attached to the contract have been met. It is then possible to combine this concept with a process or application ('bot') which can be used to trigger the 20 BTC payments once the contract has been marked as complete.

For the purposes of illustration, some example scenarios are provided below which show some of the applications for which the invention can be used. In all of these scenarios, the content of the contract itself is considered irrelevant and non-limiting.

Example Scenario 1: Public Registry of an Asset

In this scenario, Bob decides to publish his ownership of an asset (e.g. his home) onto the Blockchain. Nothing else is done at this stage; it is simply an asset that may then get used in subsequent transactions. In this situation, there is no termination date for the contract. FIG. 2a shows a simple state machine with two states: (i) contract is open and (ii) contract is closed. FIG. 2b shows the metadata definition carried on the bitcoin Transaction output and which specifies the contract location and proof of validity via the hash. FIG. 2c shows an 'issuance' transaction that initially stores the contract on the Blockchain (although, it actually only stores the hash not the actual contract). FIG. 2d cancels the contract by spending the bitcoin.

Example Scenario 2: Creation and Registry of an Asset with Hidden Ownership

This is a slightly enhanced version of scenario 1 where Bob wants to publish the asset onto the Blockchain, but does not want to directly reveal his ownership.

In this situation, Bob first creates a sub-key from his public key to represent the asset. This sub-key is then published as part of the asset's details onto the Blockchain.

Once again, in this situation, there is no termination date for the asset. (A detailed example is provided below for one way in which the sub-key may be generated. See section below entitled "method of sub-key generation").

The state machine for this scenario is the same as that for scenario 1, as shown in FIG. 2a. FIG. 3a shows the metadata definition for this scenario. The metadata is carried on the bitcoin Transaction output and specifies the contract location and proof of validity (via the hash). FIG. 3b shows the transaction to 'fund' the asset. That is, to put some bitcoins into the asset's public key so that the asset can fund its transactions (such as the publication transaction in FIG. 3c). FIG. 3b does not show Bob's creation of the asset sub-key as it is not a Bitcoin transaction.

FIG. 3c shows the blockchain transaction for the publication of the asset. FIG. 3d shows the transaction for closure of the contract. When the cancellation of the contract is required, the UTXO is spent. In this situation, the requirement has been for both the Asset and the hidden owner of the asset to sign.

Example Scenario 3: Lease Contract

In this illustrative situation, Bob takes out a lease contract with Eve for a fixed term of three years. The terms of the contract will specify a number of payments. The details of the payment are not relevant in regard to the present invention. However, the contract has a fixed term with no break clauses.

This has a simple state machine model as shown in FIG. 4a. FIG. 4b shows the metadata for this scenario. FIG. 4c shows the transaction to publish the ownership of the asset onto the Blockchain. Firstly, Bob provides some funding to the asset, then the asset publishes itself.

Example Scenario 4: Rolling Contract

In this illustrative situation, Bob decides to lease a house from Eve on a rolling annual basis, where he needs to provide two months' notice to cancel the lease at the renewal date otherwise it will automatically roll-on. This has a simple state machine model as shown in FIG. 5a. FIG. 5b shows the metadata for this scenario. FIG. 5c shows the transaction to publish the initial contract and the initial rollover of the contract onto the Blockchain.

After the first year, Bob continues with the lease and does not terminate. Immediately after EVE-S3-T2 is published then it is picked up by an automated computing agent and rolled-on for another year. It should be noted that it is also possible that this could be done by EVE using internal logic of her own.

After the second year, Bob chooses to terminate the lease and submits a transaction using the same input as EVE-S3-T3. However, because this transaction has not yet been submitted, the input is unspent and if Bob's transaction is published to the Blockchain first it will invalidate EVE-S3-T3. Whilst the amounts involved are trivial, the bot will not countersign the transaction unless the output is directed to Eve's public key hash (or whatever the contract actually states). The transaction for the termination of Bob's contract is shown in FIG. 5d.

Example Scenario 5: Contract Conditionality

In this illustrative situation, Bob enters into a contract with a pool of builders to deliver a new property, and specifies a number of conditions within the contract that require independent sign-off (the first being the approval of the plans from the local planning authority). This has a simple state machine model as shown in FIG. 6a. FIG. 6b shows the metadata for this scenario. FIG. 6c shows the transaction wherein Bob creates the initial contract and the two sub-contracts (after deriving the relevant sub-key, possibly using the sub-key generation technique described below) and publishes them. FIG. 6d shows the transaction for when the planning permission has been signed off.

Codification Scheme

The metadata which is used to reference the contract can be formatted in a variety of ways. However, a suitable codification scheme is described here.

A contract is transferable if the rights it defines are conferred upon the holder or owner of the contract. An example of a non-transferable contract is one in which the participants are named—that is, where the rights are conferred upon a specific named entity rather than the holder of the contract. Only transferable contracts are discussed in this codification scheme.

A token represents a specific contract that details or defines rights conferred by a contract. In accordance with the present invention, the token is a representation of the contract in the form of a bitcoin transaction.

This codification method uses metadata comprising three parameters or data items. This data may be indicative of:
  i) an amount of shares available under the contract (this may be referred to herein as NumShares');
  ii) a quantity of transfer units to be transferred from a sender to at least one recipient (this may be referred to herein as 'ShareVal'); and
  iii) a factor for calculating a value for the quantity of transfer units (this may be referred to herein as a 'pegging rate').

An advantage of this codification scheme is that it can be used to encapsulate or represent contracts as tokens on a blockchain using only the three parameters described above. In effect, the contract can be specified using a minimum of these three data items. As this codification scheme can be used for any type of transferable contract, common algorithms can be devised and applied. Further detail of these metadata items is provided as follows.

A divisible token is one in which the value on a transaction output may be subdivided into smaller amounts allocated across multiple tokens (i.e. allocated across multiple transactions). The archetype is tokenised fiat currency. Divisible contracts are defined as those that specify a non-zero PeggingRate. For divisible contracts the tokenised value transferred in the transaction output is tied to the underlying bitcoin (BTC) value via the PeggingRate. That is, the contract specifies the holder's rights in terms of a pegging-rate. For non-divisible tokens there is no PeggingRate and the contract specifies the holder's rights in terms of a fixed value (e.g. like a bearer bond: 'this contract is redeemable for exactly $1000' or a voucher 'this contract is redeemable for one haircut'). For non-divisible contracts the underlying transaction BTC value is irrelevant to the contract value.

The phrase "Underlying BTC value" refers to the bitcoin amount (BTC) attached to the transaction output. In the Bitcoin protocol every transaction output must have non-zero BTC amount to be considered valid. In fact, the BTC amount must be greater than a set minimum (known as 'dust') which, at the time of writing, is currently set to 546 satoshis. 1 bitcoin is defined as being equal to 100 million satoshis. As the bitcoin transactions are here used only as a means of facilitating an exchange of ownership, the actual underlying BTC amount is arbitrary: the true value lies in the contract specification. In theory every token could be carried by dust.

In accordance with the present codification scheme, specifically for divisible tokens, the underlying BTC value does have a meaning: it bears a relationship to the contract value via a PeggingRate. The PeggingRate is itself arbitrary and is chosen so as to keep the underlying BTC amount small. The reason for using a PeggingRate rather than simply underlying every token transaction with dust is because the protocol of the present invention facilitates divisibility: when a token is split into several transaction outputs of smaller amounts it is not necessary to adjust the original contract. Rather, the contract value of each subdivided token is simply calculated based on the PeggingRate and the subdivided amount of underlying BTC value.

A limited token is one in which a total issuance value is fixed (or 'limited') by a fixed non-zero number of shares as defined by a quantity called NumShares. Therefore, no further shares may be issued under a limited contract. For example a contract for part ownership of a race horse is limited to 100% of the race horse (e.g. 100 shares at 1% each or 10 shares at 10% each, etc.). An unlimited contract implies that the issuer is able to underwrite further issuances of shares, for example by adding the required amount of fiat currency into their Reserve Account. NumShares must be explicitly stated on all contracts. Limited contracts must have NumShares>0; unlimited contracts are denoted by setting NumShares=0.

The archetypical example is a currency reserve (analogous to a gold reserve) such that the total value held in the reserve bank account matches the total value in promissory notes in existence (i.e. unredeemed tokens). This concept extends beyond currency reserves to include stock inventory. For example, an issuer of licensed printed t-shirt tokens may start with an inventory of 10,000 T-shirts in stock and may issue a divisible token to represent those 10,000 t-shirts (where, say, each share=1 t-shirt). The original token could be subdivided and each subdivided token would be redeemable for a number of t-shirts according to the transaction output's underlying BTC value as defined by the PeggingRate. If demand increases, however, the issuer may decide to issue further shares (i.e. increase the number of shares in circulation by (say) another 10,000). In such cases it is incumbent on the issuer to deposit a further 10,000 t-shirts into his reserve account (i.e. stock warehouse) in order to underwrite the further issuance. Thus, the total number of t-shirts in stock (where stock acts as 'reserve account') at any one time=the total number of unredeemed shares.

PeggingRates only apply to divisible contracts, wherein the value of a share (represented by a quantity called ShareVal) is pegged to the underlying BTC amount. For example, the contract might specify that the issuer promises to redeem the token at a rate of $10,000 for every underlying 1 BTC. That would mean (for example) that a transaction with a tokenised underlying output value of 15,400 satoshis would be redeemable for $1.54. A value of 0 for the PeggingRate indicates that the contract is non-divisible (i.e. can only be transferred whole, like a bearer bond). When the PeggingRate is set to 0 (meaning non-divisible token) the underlying BTC value is not relevant to the contract value and can be set at any amount. Normally in this case it is desirable to keep the underlying BTC amount as small as possible (i.e. set to dust) to minimise operating costs.

NumShares is the total (fixed) number of shares available under the (Limited) contract. For limited contracts NumShares must be a whole number greater than zero. For unlimited contracts NumShares is not fixed as more shares can be issued at any time (provided they are underwritten), which is denoted by setting the value to 0.

A share is defined as the unit of transfer and the ShareVal is the value of that unit. For example, for fiat currency, the unit of transfer may be set to 1 cent. Or, for example, it may be set to 50 cents, in which case transfers may only be executed in 'lots' of 50 cents. ShareVal may also be expressed as a percentage: for example if a breeder wants to sell a racehorse in 10 equal shares then the ShareVal=10%. ShareVal must be >0 and must be defined on the contract.

TotalIssuance represents the total value of shares issued. This value only relates to limited contracts as for unlimited contracts the issuance is not fixed and more shares may be issued. If the shares are expressed as a percentage then the TotalIssuance=100% by definition.

For limited contracts NumShares, ShareVal, and TotalIssuance are related in the following way:

NumShares×ShareVal=TotalIssuance.

A value of 0 for TotalIssuance implies it is an unlimited contract. An example of an unlimited contract is fiat currency (so TotalIssuance is set to 0); examples of limited contracts are: (i) limited edition commemorative coins (1000 minted, where 1 share=1 coin): TotalIssuance=1000×1=1000 coins; and (ii) seats at a ticketed venue, where TotalIssuance=total number of seats available.

The circulation is defined as the total value of unspent tokens (i.e. as determined by transactions in UTXO—unspent transaction output). The full set of all unspent transactions is kept in a list available to all bitcoin nodes. For example, if an issuer initially issues $10,000 as fiat currency type tokens and over time $5500 worth of tokens are redeemed, then the circulation=$4500 (being the value of unredeemed tokens). This value should reconcile to the balance in the associated reserve account.

Method of Sub-Key Generation

Above, Table 3 and the example scenarios refer to situations where it is advantageous to generate a sub-key from an original (master) key. A method for achieving this is now provided for illustration of one way in which this could be performed.

Figure 7:
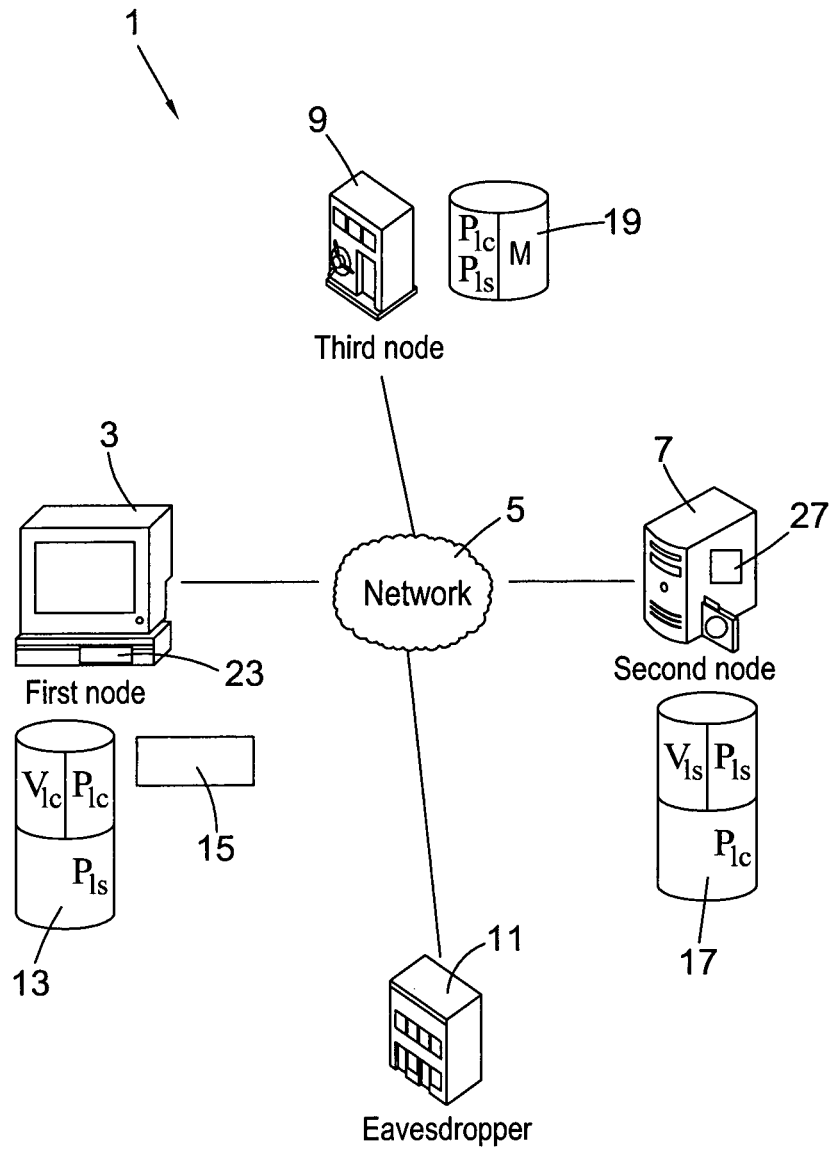
Figure 8:
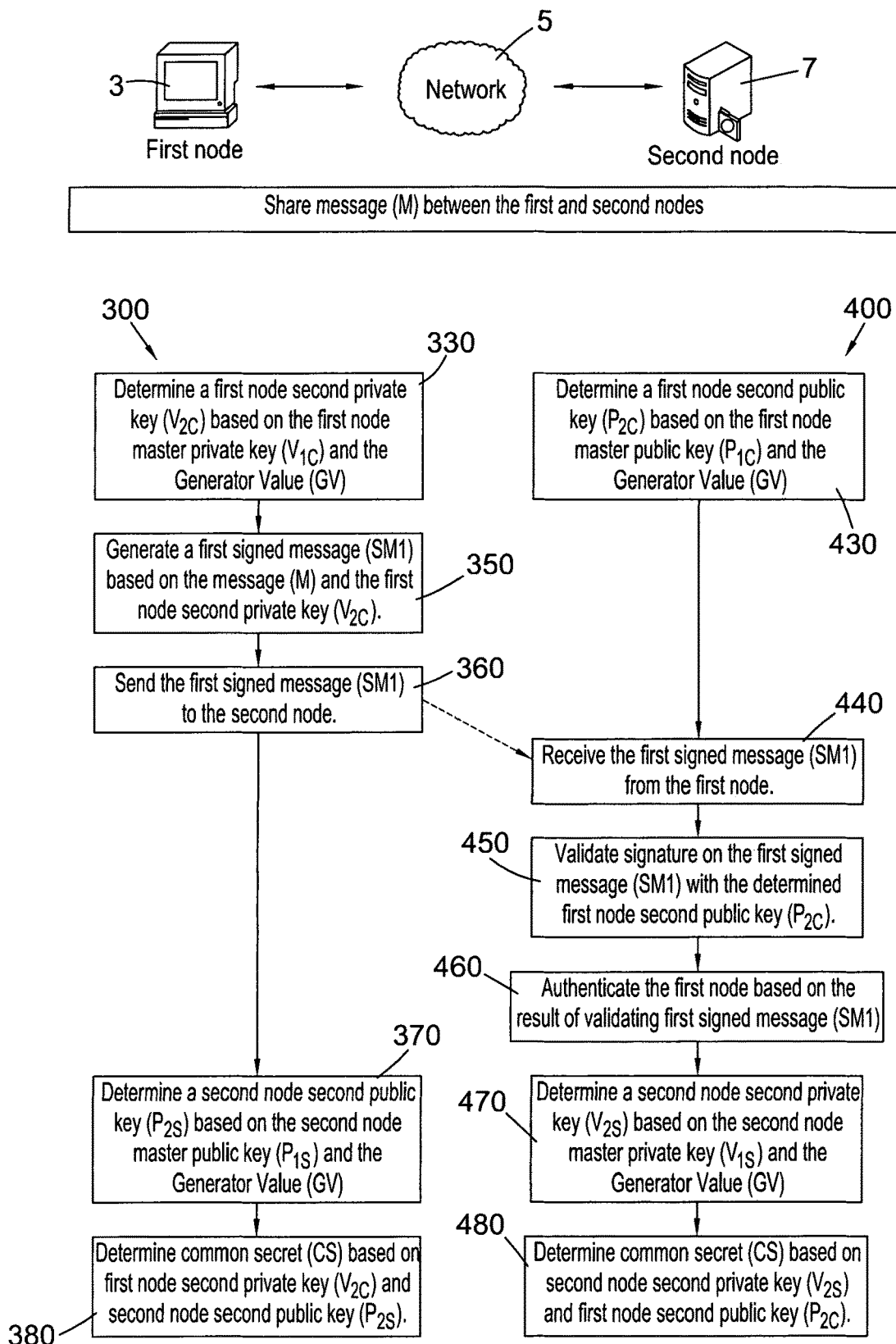

FIG. 7 illustrates a system 1 that includes a first node 3 which is in communication with a second node 7 over a communications network 5. The first node 3 has an associated first processing device 23 and the second node 5 has an associated second processing device 27. The first and second nodes 3, 7 may include an electronic device, such as a computer, phone, tablet computer, mobile communication device, computer server etc. In one example, the first node 3 may be a client (user) device and the second node 7 may be a server. The server may be a digital wallet provider's server.

The first node 3 is associated with a first asymmetric cryptography pair having a first node master private key ($V_{1C}$) and a first node master public key ($P_{1C}$). The second node (7) is associated with a second asymmetric cryptography pair having a second node master private key ($V_{1S}$) and a second node master public key ($P_{1S}$). In other words, the first and second nodes are each in possession of respective public-private key pairs.

The first and second asymmetric cryptography pairs for the respective first and second nodes 3, 7 may be generated during a registration process, such as registration for a wallet. The public key for each node may be shared publicly, such as over communications network 5.

To determine a common secret (CS) at both the first node 3 and second node 7, the nodes 3, 7 perform steps of respective methods 300, 400 without communicating private keys over the communications network 5.

The method 300 performed by the first node 3 includes determining 330 a first node second private key ($V_{2C}$) based on at least the first node master private key ($V_{1C}$) and a Generator Value (GV). The Generator Value may be based on a message (M) that is a shared between the first and second nodes, which may include sharing the message over the communications network 5 as described in further detail below. The method 300 also includes determining 370 a second node second public key ($P_{2S}$) based on at least the second node master public key ($P_{1S}$) and the Generator Value (GV). The method 300 includes determining 380 the common secret (CS) based on the first node second private key ($V_{2C}$) and the second node second public key ($P_{2S}$).

Importantly, the same common secret (CS) can also be determined at the second node 7 by method 400. The method 400 includes determining 430 a first node second public key ($P_{2C}$) based on the first node master public key ($P_{1C}$) and the Generator Value (GV). The method 400 further include determining 470 a second node second private key ($V_{2S}$) based on the second node master private key (V is) and the Generator Value (GV). The method 400 includes determining 480 the common secret (CS) based on the second node second private key ($V_{2S}$) and the first node second public key ($P_{2C}$).

The communications network 5 may include a local area network, a wide area network, cellular networks, radio communication network, the internet, etc. These networks, where data may be transmitted via communications medium such as electrical wire, fibre optic, or wirelessly may be susceptible to eavesdropping, such as by an eavesdropper 11. The method 300, 400 may allow the first node 3 and second node 7 to both independently determine a common secret without transmitting the common secret over the communications network 5.

Thus one advantage is that the common secret (CS) may be determined securely and independently by each node without having to transmit a private key over a potentially unsecure communications network 5. In turn, the common secret may be used as a secret key (or as the basis of a secret key).

The methods 300, 400 may include additional steps. See FIG. 11. The method 300 may include, at the first node 3, generating a signed message (SM1) based on the message (M) and the first node second private key ($V_{2C}$). The method 300 further includes sending 360 the first signed message (SM1), over the communications network, to the second node 7. In turn, the second node 7 may perform the steps of receiving 440 the first signed message (SM1). The method 400 also includes the step of validating 450 the first signed message (SM2) with the first node second public key ($P_{2C}$) and authenticating 460 the first node 3 based on the result of validating the first signed message (SM1). Advantageously, this allows the second node 7 to authenticate that the purported first node (where the first signed message was generated) is the first node 3. This is based on the assumption that only the first node 3 has access to the first node master private key ($V_{1C}$) and therefore only the first node 3 can determine the first node second private key ($V_{2C}$) for generating the first signed message (SM1). It is to be appreciated that similarly, a second signed message (SM2) can be generated at the second node 7 and sent to the first node 3 such that the first node 3 can authenticate the second node 7, such as in a peer-to-peer scenario.

Sharing the message (M) between the first and second nodes may be achieved in a variety of ways. In one example, the message may be generated at the first node 3 which is then sent, over the communications network 5, the second node 7. Alternatively, the message may be generated at the second node 7 and then sent, over the communications network 5, to the second node 7. In some examples, the message (M) may be public and therefore may be transmitted over an unsecure network 5. One or more messages (M) may be stored in a data store 13, 17, 19. The skilled person will realise that sharing of the message can be achieved in a variety of ways.

Advantageously, a record to allow recreation of the common secret (CS) may be kept without the record by itself having to be stored privately or transmitted securely.

Method of Registration 100, 200

An example of a method of registration 100, 200 will be described with reference to FIG. 9, where method 100 is performed by the first node 3 and method 200 is performed by the second node 7. This includes establishing the first and second asymmetric cryptography pairs for the respective first and second nodes 3, 7.

The asymmetric cryptography pairs include associated private and public keys, such as those used in public-key encryption. In this example, the asymmetric cryptography pairs are generated using Elliptic Curve Cryptography (ECC) and properties of elliptic curve operations.

In the method 100, 200, this includes the first and second nodes agreeing 110, 210 on a common ECC system and using a base point (G). (Note: the base point could be referred to as a Common Generator, but the term 'base point' is used to avoid confusion with the Generator Value GV). In one example, the common ECC system may be based on secp256K1 which is an ECC system used by Bitcoin. The base point (G) may be selected, randomly generated, or assigned.

Turning now to the first node 3, the method 100 includes settling 110 on the common ECC system and base point (G). This may include receiving the common ECC system and base point from the second node 7, or a third node 9. Alternatively, a user interface 15 may be associated with the first node 3, whereby a user may selectively provide the common ECC system and/or base point (G). In yet another alternative one or both of the common ECC system and/or base point (G) may be randomly selected by the first node 3. The first node 3 may send, over the communications network 5, a notice indicative of using the common ECC system with a base point (G) to the second node 7. In turn, the second node 7 may settle 210 by sending a notice indicative of an acknowledgment to using the common ECC system and base point (G).

The method 100 also includes the first node 3 generating 120 a first asymmetric cryptography pair that includes the first node master private key ($V_{1C}$) and the first node master public key ($P_{1C}$). This includes generating the first node master private key ($V_{1C}$) based, at least in part, on a random integer in an allowable range specified in the common ECC system. This also includes determining the first node master public key ($P_{1C}$) based on elliptic curve point multiplication of the first node master private key ($P_{1C}$) and the base point (G) according to the formula:

$$P_{1C} = V_{1C} \times G \qquad \text{(Equation 1)}$$

Thus the first asymmetric cryptography pair includes:

$V_{1C}$: The first node master private key that is kept secret by the first node.

$P_{1C}$: The first node master public key that is made publicly known.

The first node 3 may store the first node master private key ($V_{1C}$) and the first node master public key ($P_{1C}$) in a first data store 13 associated with the first node 3. For security, the first node master private key ($V_{1C}$) may be stored in a secure portion of the first data store 13 to ensure the key remains private.

Figure 9:
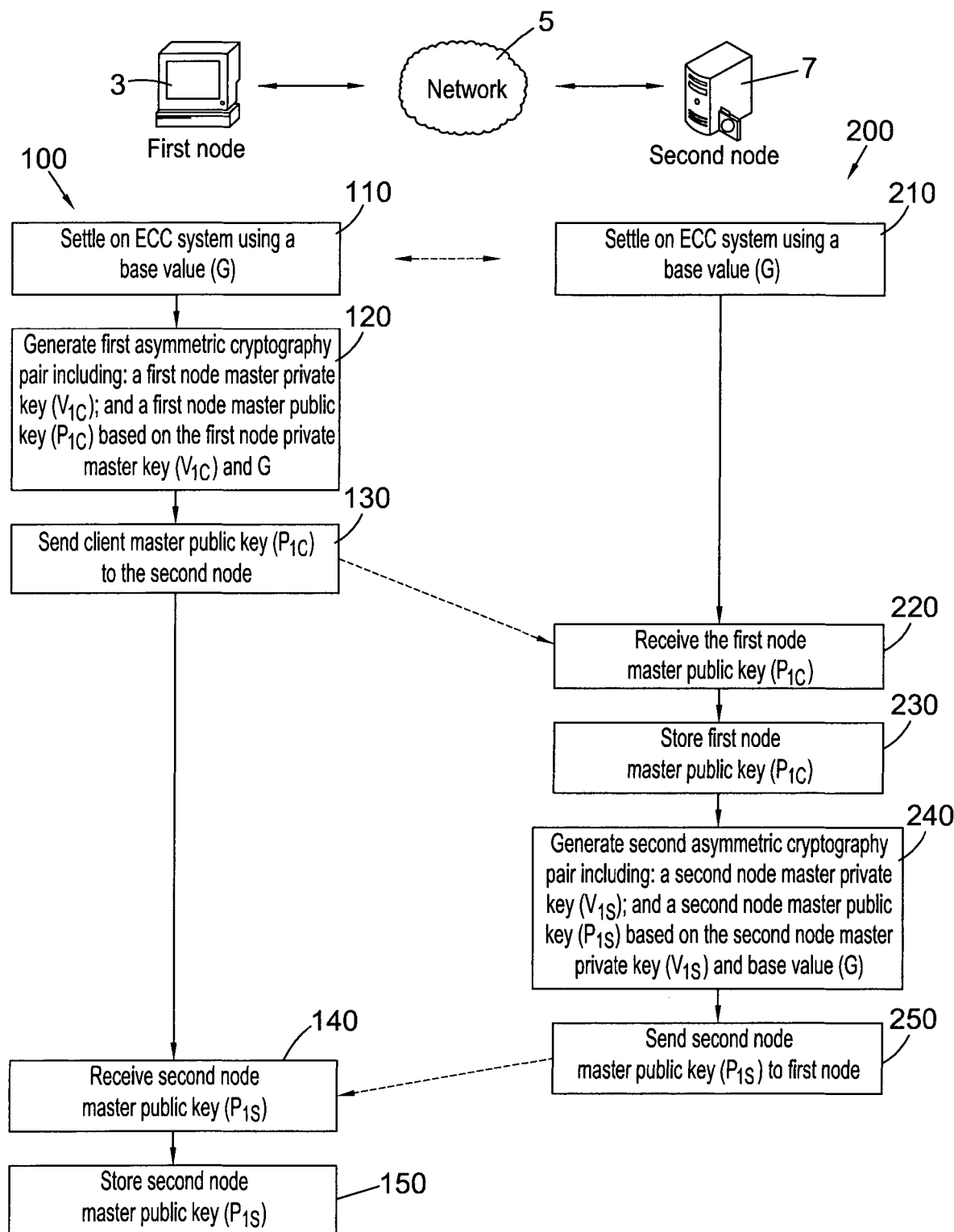

The method 100 further includes sending 130 the first node master public key ($P_{1C}$), over the communications network 5, to the second node 7, as shown in FIG. 9. The second node 7 may, on receiving 220 the first node master public key ($P_{1C}$), store 230 the first node master public key ($P_{1C}$) in a second data store 17 associated with the second node 7.

Similar to the first node 3, the method 200 of the second 7 includes generating 240 a second asymmetric cryptography pair that includes the second node master private key ($V_{1S}$) and the second node master public key ($P_{1S}$). The second node master private key ($V_{1S}$) is also a random integer within the allowable range. In turn, the second node master public key ($P_{1S}$) is determined by the following formula:

$$P_{1S} = V_{1S} \times G \qquad \text{(Equation 2)}$$

Thus the second asymmetric cryptography pair includes:
$V_{1S}$: The second node master private key that is kept secret by the second node.
$P_{1S}$: The second node master public key that is made publicly known.

The second node 7 may store the second asymmetric cryptography pair in the second data store 17. The method 200 further includes sending 250 the second node master public key ($P_{1S}$) to the first node 3. In turn, the first node 3 may receive 140 and stores 150 the second node master public key ($P_{1S}$).

It is to be appreciated that in some alternatives, the respective public master keys may be received and stored at a third data store 19 associated with the third node 9 (such as a trusted third party). This may include a third party that acts as a public directory, such as a certification authority. Thus in some examples, the first node master public key ($P_{1C}$) may requested and received by the second node 7 only when determining the common secret (CS) is required (and vice versa).

The registration steps may only need to occur once as an initial setup.

Session Initiation and Determining the Common Secret by the First Node 3

Figure 10:
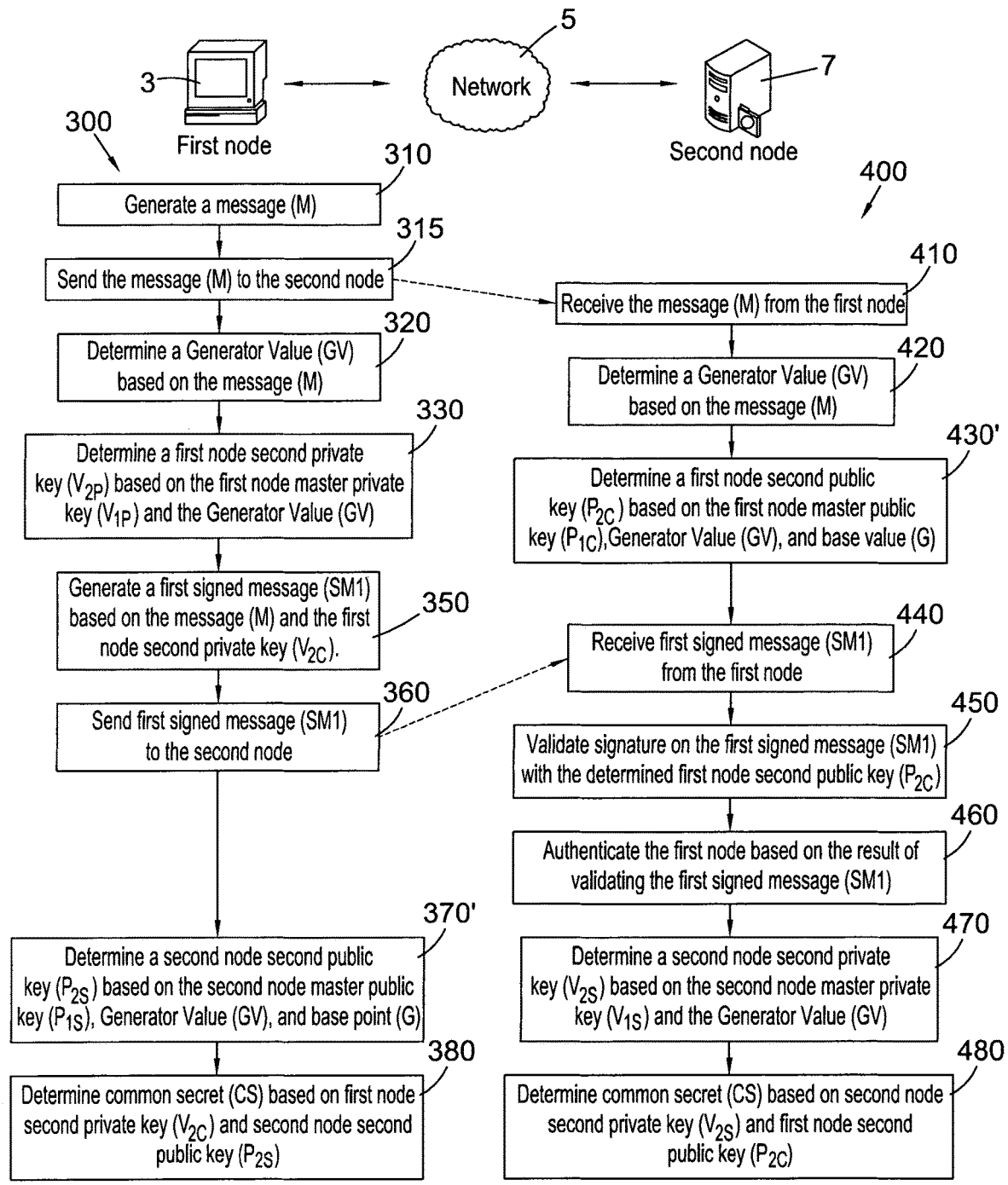
Figure 11:
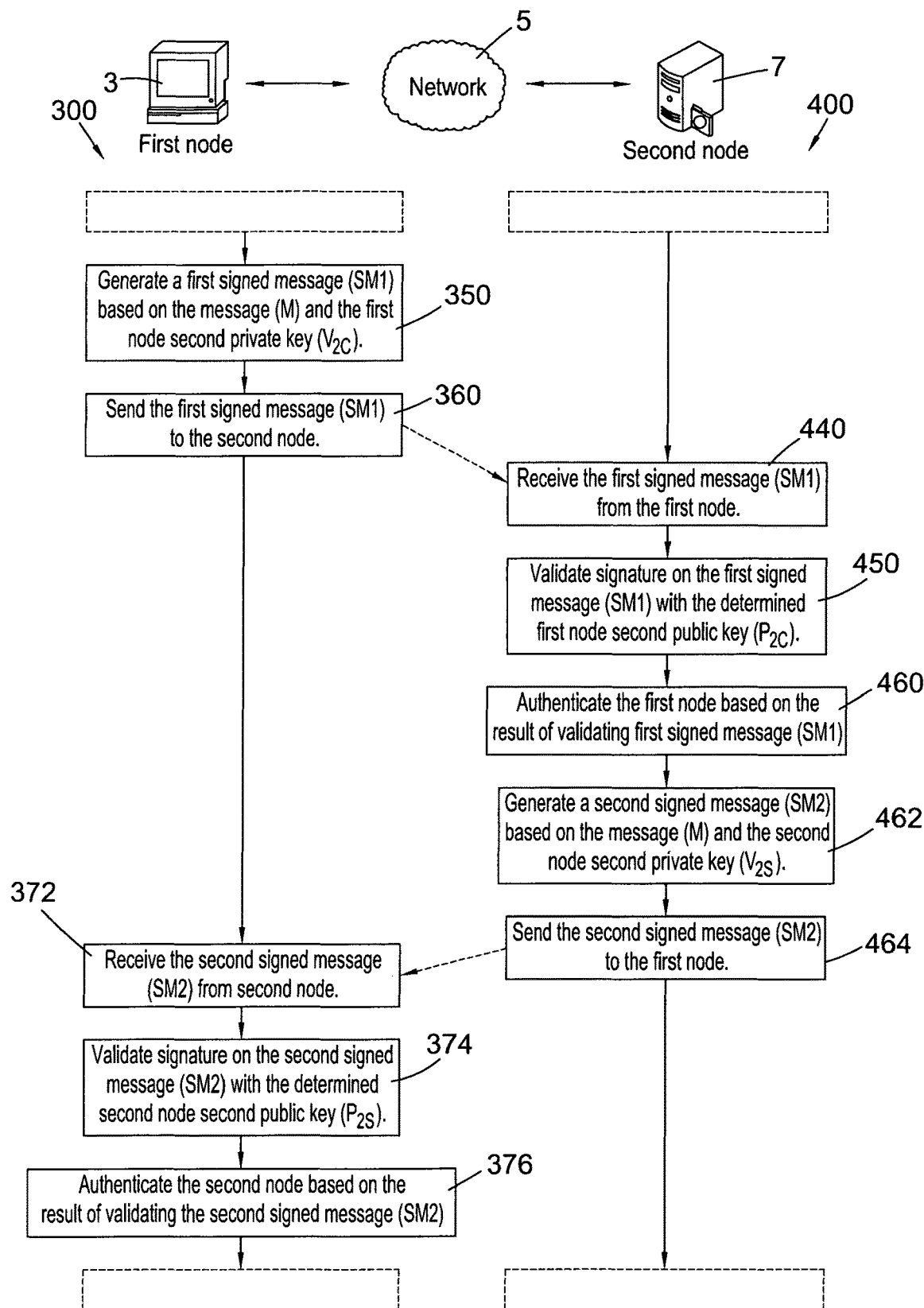

An example of determining a common secret (CS) will now be described with reference to FIG. 10. The common secret (CS) may be used for a particular session, time, transaction, or other purpose between the first node 3 and the second node 7 and it may not be desirable, or secure, to use the same common secret (CS). Thus the common secret (CS) may be changed between different sessions, time, transactions, etc.

The following is provided for illustration of the secure transmission technique which has been described above.

Generating a Message (M) 310

In this example, the method 300 performed by the first node 3 includes generating 310 a message (M). The message (M) may be random, pseudo random, or user defined. In one example, the message (M) is based on Unix time and a nonce (and arbitrary value). For example, the message (M) may be provided as:

$$\text{Message}(M) = \text{UnixTime} + \text{nonce} \qquad \text{(Equation 3)}$$

In some examples, the message (M) is arbitrary. However it is to be appreciated that the message (M) may have selective values (such as Unix Time, etc) that may be useful in some applications.

The method 300 includes sending 315 the message (M), over the communications network 3, to the second node 7. The message (M) may be sent over an unsecure network as the message (M) does not include information on the private keys.

Determining a Generator Value (GV) 320

The method 300 further includes the step of determining 320 a Generator Value (GV) based on the message (M). In this example, this includes determining a cryptographic hash of the message. An example of a cryptographic hash algorithm includes SHA-256 to create a 256-bit Generator Value (GV). That is:

$$GV = \text{SHA-256}(M) \qquad \text{(Equation 4)}$$

It is to be appreciated that other hash algorithms may be used. This may include other hash algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

Determining a First Node Second Private Key 330

The method 300 then includes the step 330 of determining 330 the first node second private key ($V_{2C}$) based on the second node master private key ($V_{1C}$) and the Generator Value (GV). This can be based on a scalar addition of the first node master private key ($V_{1C}$) and the Generator Value (GV) according to the following formula:

$$V_{2C} = V_{1C} + GV \qquad \text{(Equation 5)}$$

Thus the first node second private key ($V_{2C}$) is not a random value but is instead deterministically derived from the first node master private key. The corresponding public key in the cryptographic pair, namely the first node second public key ($P_{2C}$), has the following relationship:

$$P_{2C} = V_{2C} \times G \qquad \text{(Equation 6)}$$

Substitution of $V_{2C}$ from Equation 5 into Equation 6 provides:

$$P_{2C} = (V_{1C} + GV) \times G \qquad \text{(Equation 7)}$$

where the '+' operator refers to scalar addition and the 'x' operator refers to elliptic curve point multiplication. Noting that elliptic curve cryptography algebra is distributive, Equation 7 may be expressed as:

$$P_{2C} = V_{1C} \times G + GV \times G \qquad \text{(Equation 8)}$$

Finally, Equation 1 may be substituted into Equation 7 to provide:

$$P_{2C} = P_{1C} + GV \times G \qquad \text{(Equation 9.1)}$$

$$P_{2C} = P_{1C} + \text{SHA-256}(M) \times G \qquad \text{(Equation 9.2)}$$

In equations 8 to 9.2, the '+' operator refers to elliptic curve point addition. Thus the corresponding first node second public key ($P_{2C}$) can be derivable given knowledge of the first node master public key ($P_{1C}$) and the message (M). The second node 7 may have such knowledge to independently determine the first node second public key ($P_{2C}$) as will be discussed in further detail below with respect to the method 400.

Generate a First Signed Message (SM1) Based on the Message and the First Node Second Private Key 350

The method 300 further includes generating 350 a first signed message (SM1) based on the message (M) and the determined first node second private key ($V_{2C}$). Generating a signed message includes applying a digital signature algorithm to digitally sign the message (M). In one example, this includes applying the first node second private key ($V_{2C}$) to the message in an Elliptic Curve Digital Signature Algorithm (ECDSA) to obtain the first signed message (SM1). Examples of ECDSA include those based on ECC systems with secp256k1, secp256r1, secp384r1, se3cp521r1.

The first signed message (SM1) can be verified with the corresponding first node second public key ($P_{2C}$) at the second node 7. This verification of the first signed message (SM1) may be used by the second node 7 to authenticate the first node 3, which will be discussed in the method 400 below.

Determine a Second Node Second Public Key 370'

The first node 3 may then determine 370 a second node second public key ($P_{2S}$). As discussed above, the second node second public key ($P_{2S}$) may be based at least on the second node master public key ($P_{1S}$) and the Generator Value (GV). In this example, since the public key is determined 370' as the private key with elliptic curve point multiplication with the base point (G), the second node second public key ($P_{2S}$) can be expressed, in a fashion similar to Equation 6, as:

$$P_{2S} = V_{2S} \times G \qquad \text{(Equation 10.1)}$$

$$P_{2S} = P_{1S} + GV \times G \qquad \text{(Equation 10.2)}$$

The mathematical proof for Equation 10.2 is the same as described above for deriving Equation 9.1 for the first node second public key ($P_{2C}$). It is to be appreciated that the first node 3 can determine 370 the second node second public key independently of the second node 7.

Determine the Common Secret 380 at the First Node 3

The first node 3 may then determine 380 the common secret (CS) based on the determined first node second private key ($V_{2C}$) and the determined second node second public key ($P_{2S}$). The common secret (CS) may be determined by the first node 3 by the following formula:

$$S = V_{2C} \times P_{2S} \qquad \text{(Equation 11)}$$

Method 400 Performed at the Second Node 7

The corresponding method 400 performed at the second node 7 will now be described. It is to be appreciated that some of these steps are similar to those discussed above that were performed by the first node 3.

The method 400 includes receiving 410 the message (M), over the communications network 5, from the first node 3. This may include the message (M) sent by the first node 3 at step 315. The second node 7 then determines 420 a Generator Value (GV) based on the message (M). The step of determining 420 the Generator Value (GV) by the second node 7 is similar to the step 320 performed by the first node described above. In this example, the second node 7 performs this determining step 420 independent of the first node 3.

The next step includes determining 430 a first node second public key ($P_{2C}$) based on the first node master public key ($P_{1C}$) and the Generator Value (GV). In this example, since the public key is determined 430' as the private key with elliptic curve point multiplication with the base point (G), the first node second public key ($P_{2C}$) can be expressed, in a fashion similar to Equation 9, as:

$$P_{2C} = V_{2C} \times G \qquad \text{(Equation 12.1)}$$

$$P_{2C} = P_{1C} + GV \times G \qquad \text{(Equation 12.2)}$$

The mathematical proof for Equations 12.1 and 12.2 is the same as those discussed above for Equations 10.1 and 10.2.

The Second Node 7 Authenticating the First Node 3

The method 400 may include steps performed by the second node 7 to authenticate that the alleged first node 3, is the first node 3. As discussed previously, this includes receiving 440 the first signed message (SM1) from the first node 3. The second node 7 may then validate 450 the signature on the first signed message (SM1) with the first node second public key ($P_{2C}$) that was determined at step 430.

Verifying the digital signature may be done in accordance with an Elliptic Curve Digital Signature Algorithm (ECDSA) as discussed above. Importantly, the first signed message (SM1) that was signed with the first node second private key ($V_{2C}$) should only be correctly verified with the corresponding first node second public key ($P_{2C}$), since $V_{2C}$ and $P_{2C}$ form a cryptographic pair. Since these keys are deterministic on the first node master private key ($V_{1C}$) and the first node master public key ($P_{1C}$) that were generated at registration of the first node 3, verifying first signed message (SM1) can be used as a basis of authenticating that an alleged first node sending the first signed message (SM1) is the same first node 3 during registration. Thus the second node 7 may further perform the step of authenticating (460) the first node 3 based on the result of validating (450) the first signed message.

The Second Node 7 Determining the Common Secret

The method 400 may further include the second node 7 determining 470 a second node second private key ($V_{2S}$) based on the second node master private key (V is) and the Generator Value (GV). Similar to step 330 performed by the first node 3, the second node second private key ($V_{2S}$) can be based on a scalar addition of the second node master private key ($V_{1S}$) and the Generator Value (GV) according to the following formulas:

$$V_{2S} = V_{1S} + GV \qquad \text{(Equation 13.1)}$$

$$V_{2S} = V_{1S} + SHA\text{-}256(M) \qquad \text{(Equation 13.2)}$$

The second node 7 may then, independent of the first node 3, determine 480 the common secret (CS) based on the second node second private key ($V_{2S}$) and the first node second public key ($P_{2C}$) based on the following formula:

$$S = V_{2S} \times P_{2C} \qquad \text{(Equation 14)}$$

Proof of the Common Secret (CS) determined by the First Node 3 and Second Node 7

The common secret (CS) determined by the first node 3 is the same as the common secret (CS) determined at the second node 7. Mathematical proof that Equation 11 and Equation 14 provide the same common secret (CS) will now be described.

Turning to the common secret (CS) determined by the first node 3, Equation 10.1 can be substituted into Equation 11 as follows:

$$S = V_{2C} \times P_{2S} \qquad \text{(Equation 11)}$$

$$S = V_{2C} \times (V_{2S} \times G)$$

$$S = (V_{2C} \times V_{2S}) \times G \qquad \text{(Equation 15)}$$

Turning to the common secret (CS) determined by the second node 7, Equation 12.1 can be substituted into Equation 14 as follows:

$$S = V_{2S} \times P_{2C} \qquad \text{(Equation 14)}$$

$$S = V_{2S} \times (V_{2C} \times G)$$

$$S = (V_{2S} \times V_{2C}) \times G \qquad \text{(Equation 16)}$$

Since ECC algebra is commutative, Equation 15 and Equation 16 are equivalent, since:

$$S = (V_{2C} \times V_{2S}) \times G = (V_{2S} \times V_{2C}) \times G \quad \text{(Equation 17)}$$

The Common Secret (CS) and Secret Key

The common secret (CS) may now be used as a secret key, or as the basis of a secret key in a symmetric-key algorithm for secure communication between the first node 3 and second node 7.

The common secret (CS) may be in the form of an elliptic curve point $(x_S, y_S)$. This may be converted into a standard key format using standard publicly known operations agreed by the nodes 3, 7. For example, the $x_S$ value may be a 256-bit integer that could be used as a key for AES256 encryption. It could also be converted into a 160-bit integer using RIPEMD160 for any applications requiring this length key.

The common secret (CS) may be determined as required. Importantly, the first node 3 does not need to store the common secret (CS) as this can be re-determined based on the message (M). In some examples, the message(s) (M) used may be stored in data store 13, 17, 19 (or other data store) without the same level of security as required for the master private keys. In some examples, the message (M) may be publicly available. However depending on some application, the common secret (CS) could be stored in the first data store (X) associated with the first node provided the common secret (CS) is kept as secure as the first node master private key ($V_{1C}$).

Advantageously, this technique can be used to determine multiple common secrets that may correspond to multiple secure secret keys based on a single master key cryptography pair.

Hierarchy of Generator Values (Keys)

For example, a series of successive Generator Values (GVs) may be determined, where each successive GV may be determined based on the preceding Generator Value (GV). For example, instead of repeating steps 310 to 370 and 410 to 470 to generate successive single-purpose keys, by prior agreement between the nodes, the previously used Generator Value (GV) can be rehashed repeatedly by both parties to establish a hierarchy of Generator Values. In effect, the Generator Value, based on the hash of a message (M), can be a next generation message (M') for the next generation of Generator Value (GV'). Doing this allows successive generations of shared secrets to be calculated without the need for further protocol-establishment transmissions, in particular transmission of multiple messages for each generation of common secrets. The next generation common secret (CS') can be computed as follows.

Firstly, both the first node 3 and the second node 7 independently determine the next generation of the Generator Value (GV'). This is similar to steps 320 and 420 but adapted with the following formulas:

$$M' = \text{SHA-256}(M) \quad \text{(Equation 18)}$$

$$GV' = \text{SHA-256}(M') \quad \text{(Equation 19.1)}$$

$$GV' = \text{SHA-256}(\text{SHA-256}(M)) \quad \text{(Equation 19.2)}$$

The first node 3 may then determine the next generation of the second node second public key ($P_{2S}'$) and the first node second private key ($V_{2C}'$) similar to steps 370 and 330 described above, but adapted with the following formulas:

$$P_{2S}' = P_{1S} + GV' \times G \quad \text{(Equation 20.1)}$$

$$V_{2C}' = V_{1C} + GV' \quad \text{(Equation 20.2)}$$

The second node 7 may then determine the next generation of the first node second public key ($P_{2C}'$) and the second node second private key ($V_{2S}'$) similar to steps 430 and 470 described above, but adapted with the following formulas:

$$P_{2C}' = P_{1C} + GV' \times G \quad \text{(Equation 21.1)}$$

$$V_{2S}' = V_{1S} + GV' \quad \text{(Equation 21.2)}$$

The first node 3 and the second node 7 may then each determine the next generation common secret (CS'). In particular, the first node 3 determines the next generation common secret (CS') with the formula:

$$CS' = V_{2C}' \times P_{2S}' \quad \text{(Equation 22)}$$

The second node 7 determines the next generation common secret (CS') with the formula:

$$CS' = V_{2S}' \times P_{2C}' \quad \text{(Equation 23)}$$

Further generations (CS", CS''', etc.) can be calculated in the same way to create a chain hierarchy. This technique requires that both the first node 3 and the second node 7 keep track of the original Message (M) or the originally calculated Generator Value (GV), and to which node it relates. As this is publicly known information there are no security issues regarding the retention of this information. Accordingly, this information might be kept on 'hash tables' (linking hash values to public keys) and distributed freely across the network 5 (for example using Torrent). Furthermore, if any individual common secret (CS) in the hierarchy is ever compromised, this does not affect the security of any other common secrets in the hierarchy provided the private keys $V_{1C}$, $V_{1S}$ remain secure.

Tree Structure of Keys

Figure 12:
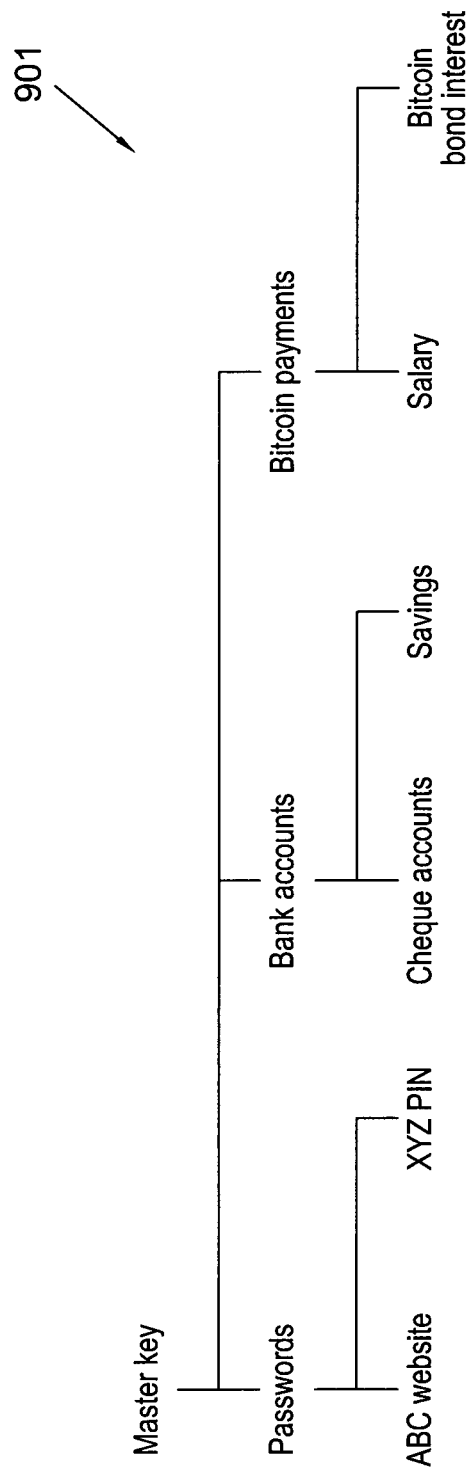

As well as a chain (linear) hierarchy as described above, a hierarchy in the form of a tree structure can be created. With a tree structure, a variety of keys for different purposes such as authentication keys, encryption keys, signing keys, payment keys, etc. may be determined whereby these keys are all linked to a single securely maintained master key. This is best illustrated in FIG. 12 that shows a tree structure 901 with a variety of different keys. Each of these can be used to create a shared secret with another party. Tree branching can be accomplished in several ways, three of which are described below.

(i) Master Key Spawning

In the chain hierarchy, each new 'link' (Public/Private key pair) is created by adding a multiply rehashed Message to the original master key. For example, (showing only the private key of the first node 3 for clarity):

$$V_{2C} = V_{1C} + \text{SHA-256}(M) \quad \text{(Equation 24)}$$

$$V_{2C}' = V_{1C} + \text{SHA-256}(\text{SHA-256}(M)) \quad \text{(Equation 25)}$$

$$V_{2C}'' = V_{1C} + \text{SHA-256}(\text{SHA-256}(\text{SHA-256}(M))) \quad \text{(Equation 26)}$$

. . . and so on.

To create a branch, any key can be used as a sub-master key. For example $V_{2C}'$ can be used as a sub-master key ($V_{3C}$) by adding the hash to it as is done for the regular master key:

$$V_{3C} = V_{2C}' + \text{SHA-256}(M) \quad \text{(Equation 27)}$$

The sub-master key ($V_{3C}$) may itself have a next generation key ($V_{3C}'$), for example:

$$V_{3C}' = V_{2C}' + \text{SHA-256}(\text{SHA-256}(M)) \quad \text{(Equation 28)}$$

Figure 13:
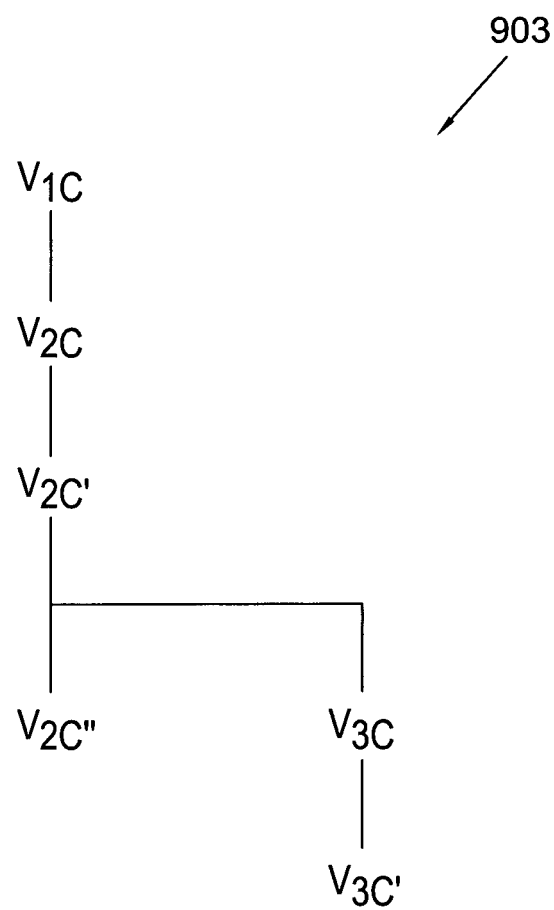

This provides a tree structure 903 using the master key spawning method as shown in FIG. 13.

(ii) Logical Association

In this method all the nodes in the tree (public/private key pairs) are generated as a chain (or in any other way) and the logical relationships between the nodes in the tree is maintained by a table in which each node in the tree is simply associated with its parent node in the tree using a pointer. Thus the pointer may be used to determine the relevant public/private key pairs for determining the common secret key (CS) for the session.

(iii) Message Multiplicity

New private/public key pairs can be generated by introducing a new message at any point in the chain or tree. The message itself may be arbitrary or may carry some meaning or function (e.g. it might be related to a 'real' bank account number, etc). It may be desirable that such new messages for forming the new private/public key pairs are securely retained.

Illustrative Computing Agent for Use with the Invention

The present invention can utilise a computing resource or agent to perform automated aspects of the contract process. An example of a suitable agent is provided below, although other implementations may be used.

The agent may operate in conjunction with the blockchain, using it as the non-erasable tape in the implementation of a Turing machine. This agent runs in parallel with the blockchain network, overseeing and handling the execution of a (looping) process. The looping process is designed to perform a given task such as, for example, the automation of a process or control of a device or system. This parallel resource monitors the state of the blockchain and can cause transactions to be written to the blockchain. In one sense, it utilises the Blockchain as a non-erasable tape of the Turing Machine, with the following definitions and features:

1. the Blockchain acts as the tape of the Turing Machine. Each transaction in the Blockchain represents a cell on the tape. This cell can contain symbols from a finite alphabet.
2. The tape head can read information from the blocks that have already been written onto the Blockchain.
3. The tape head can write new blocks, containing many transactions, to the end of the Blockchain. However, they cannot write onto blocks that already exist. As such, the Blockchain tape is non-erasable.
4. Metadata for each transaction can be stored as part of a multi-signature pay-to-script-hash (P2SH) transaction.

An important function of the agent is to act as an automated entity that monitors the current state of the Blockchain. It can also receive a signal or input from any off-block source. Depending on the Blockchain state and/or a received input, the agent may perform certain actions. The agent decides which action(s) are to be performed. These may or may not involve actions in the 'real world' (i.e. off block) and/or actions on the Blockchain (such as creating and broadcasting new transactions). The action that the agent takes may be triggered by the Blockchain state. The agent may also decide on the next set of transactions to be broadcast to the Bitcoin network, and subsequently written to the Blockchain.

The agent's action(s) run in parallel and simultaneously to the Blockchain (eg Bitcoin) network. In a sense, this extends the function of blockchain (eg Bitcoin) script. This continuous monitoring implements the 'loop' control-flow constructs making the combined agent and Blockchain system Turing Complete.

The Turing Machine includes two stacks:

Data stack: This is represented by the Blockchain as described above.

Control stack: This is represented by the agent function. This stores information relating to the repeat control-flow function.

The separation of the control stack from the data stack provides the advantage of preventing infinite loops from occurring within the Bitcoin core, mitigating denial-of-service attacks.

The agent manages and runs subroutines that are able to loop via any type of loop construct (e.g. FOR-NEXT; REPEAT UNTIL; etc). An illustrative embodiment described herein includes a process using one example of the 'repeat' construct. The user may specify the index (i) and the limit (J). These represent the current iteration number (typically counted starting from 0) and the total number of iterations of the repeat loop respectively.

For each iteration:
1. The Index increments by 1. For the exit condition, the iterations will stop when the index reaches the limit
2. A code block containing an "if condition then action" (ICTA) statement is executed; the action may be any action on or off the blockchain;
3. A cryptographic hash of this subroutine is computed. This can be stored in the Blockchain as part of a transaction. Since the hash is unique to each code, it will enable verification of which code has been used The body of the loop includes a code block. Each code block contains a "If condition then action" (ICTA) statement. This monitors the current state of the Blockchain for transactions matching the:

Start or triggering condition (e.g when a particular date is reached).

Repeat condition (i.e. a metadata or hash associated with the previous iteration).

Stop condition (i.e. last iteration of the loop).

The ICTA statement enables the agent to decide on the next transaction to make, based on the current state of the blockchain. Making the next transaction involves broadcasting the transaction onto the Bitcoin network, and writing the new transaction onto the Blockchain. This acts as a record that this iteration has been executed. Once the transaction has been written onto the Blockchain, the Manager will subsequently find that the previous iteration has been executed and written onto the Blockchain, and will execute the next iteration. The latter continues until the repeat loop exits when the index (i) reaches the limit (J) specified in the code block.

Each transaction is saved in the blockchain in a way that can be reused. In a Bitcoin implementation, each signature in a transaction is appended with a SIGHASH flag. This flag can take on different values, each indicating whether other parts of the transaction can be amended without involvement of the owner of this signature. A reusable transaction has the SIGHASH flag 'SigHash_AnyoneCanPay' in one of the transaction inputs. This permits anyone to contribute to the inputs of the transaction. This parameter enables the agent's ICTA function to be executed and repeated multiple times and with different inputs. Use of the function can be restricted to authorised parties—for example, via copyright of the reusable transaction.

The 'If condition' section of the ICTA code block can monitor any type of condition. This is similar to other programming languages (e.g. C, C++, Java) and not limited to information stored on the Blockchain. For example, it could monitor the date and time (i.e. when a certain date and time are reached) or monitor the weather (i.e. when the temperature is below 10° C. and it is raining), monitor the conditions of a contract or a trust (i.e. when company A buys company B).

The 'Then action' section of the ICTA code block can execute a number of actions. The invention is not limited with regard to the number or type of actions that can be taken. The action is not limited to a transaction on the Blockchain, although a transaction containing metadata related to the action may be written on the Blockchain.

The metadata can be of any form. However, in one embodiment, the metadata may store a hyperlink to a file containing more data or instructions relating to the action. The metadata may store both a hyperlink to a hash table containing more data or instructions relating to the action along with a hash of the action that acts as the loop-up key for the hash table.

The agent's control stack can be implemented in a number of ways that are specific to the needs of each user. For example, the repeat loop of the control stack can be based on any Turing Complete language. One possible choice of language is the Forth style stack-based language. An advantage of using this language is that it keeps the control stack consistent in programming style with the Bitcoin scripts which are already known and in wide usage.

Using the Bitcoin Script's Alternate Stack as a Data Storage Space

The Bitcoin script contains commands, also called op codes, which enable users to move data onto an alternative stack, known as the 'alt stack'.

The op codes are:

OP_TOALTSTACK—which moves data from the top of the main stack onto the top of the alt stack.

OP_FROMALTSTACK—which moves data from the top of the alt stack to the top of the main stack.

This enables data from intermediate steps of calculations to be stored in the alt stack, similar to the 'memory' function which allows data to be stored on the calculator. In one embodiment, the alt stack is used for configuring bitcoin scripts to solve small computation tasks and returning the results in the computation.

Using a Code Register to Manage the Agent

The agent also manages a registry of all the codes that it owns and runs. This registry is structured like a lookup table or dictionary that maps a specific key to a specific value. The key and value pair is represented by the hash of the code block ($H_1$) and the IPv6 address of where the code is stored respectively. To retrieve the code block using the key $H_1$, the lookup table is used to retrieve the associated value (this is the location where the code is stored) and retrieves the source code accordingly. The implementation of the code registry can vary.

Transaction Metadata of the Agent's Code, and Re-Spawning of the Loop

Information required to respawn the agent's loop at a particular iteration is stored as metadata in the transaction recorded on the Blockchain.

In this way, a transaction on the blockchain stores or provides access to information about a given iteration of the loop which is being executed on the agent. This information can include the values of any variables associated with the loop, such as index i, and any other necessary information such as values for parameters used in the code block or location-related data specifying where further required information can be accessed.

The metadata itself is stored as part of a multi-signature pay-to-script-hash script (P2SH) in the transaction. The metadata recorded with the transaction also gives the ability to record an audit trail of how the code has been executed in the past.

There are several ways in which the agent could respawn the repeat loop code block at each iteration. The code block might be hard-coded into the agent itself, or could be stored in a private or publicly available file, or stored as an entry on a private or public hash table file, or a combination of the above. The code block could be static with hard-coded variables or could be static but contain parameter(s) that can be populated. The parameters could be single values of any data format, or could be small chunks of code, or be combinations of the above. The parameters could be populated by retrieving them directly from metadata in a transaction (e.g. bitcoin transaction) or from an external source such as an internal database or a private/public file or hash table or any combination of the above. Pointers to the external source of parameter values might be stored in metadata in a transaction.

The following steps provide one example of how the agent can respawn a repeat loop code block at the ith iteration. In this example, the code registry is a hash table whereby the hash values act as look-up keys for the table and are stored in metadata on transactions.

1. The agent monitors the Blockchain for transactions that contain hashes of the code block that matches entries in the code registry.
2. The agent finds a transaction that contains the corresponding hash ($H_1$).
3. The agent reads the 'Metadata-CodeHash', gets the CodeHash field to get $H_1$ and uses it to retrieve the code ($C_1$). If RIPEMD-160(SHA256($C_1$)) equals $H_1$, the code has not been changed and it is safe to proceed to the next step.
4. The agent reads the 'Metadata-CodeHash' which stores the index I, and respawns the code at the $i^{th}$ iteration. In other words, the loop is 'reloaded' at the appropriate iteration
5. The signature of the User is included in the P2SH command to verify the origin of the metadata.
6. The agent reads the 'Metadata-OutputHash' and 'Metadata-OutputPointer' to retrieve the output of the previous steps, if these data are required for this iteration of the loop.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method of controlling the visibility and/or performance of a contract, the method comprising:
   (a) storing a contract on or in a computer-based repository;
   (b) broadcasting a transaction to a blockchain, the transaction comprising:
      i) at least one unspent output (UTXO); and
      ii) metadata comprising an identifier indicative of a location where the contract is stored;
   (c) interpreting the contract as open or valid until the unspent output (UTXO) is spent on the blockchain; and
   (d) renewing or rolling the contract on by:
      generating a new key using data relating to a previous key associated with the contract;
      generating a script comprising the new key, the location of the contract and a hash of the contract; and
      paying an amount of currency to a transaction comprising the script.

2. A method according to claim 1 wherein the transaction further comprises a deterministic redeem script address, wherein the redeem script address is a pay-to-script-hash (P2SH) address.

3. A method according to claim 2 and further comprising the step of terminating the contract by broadcasting a further transaction to the blockchain to spend the output (UTXO).

4. A method according to claim 3 wherein the further transaction comprises:
   an input which is the output (UTXO); and
   an unlocking script comprising a signature; the metadata; and a public key.

5. A method according to claim 1 wherein the contract defines:
   i) at least one condition; and
   ii) at least one action whose performance is dependent upon the evaluation of the condition; and/or
   wherein the metadata comprises:
   i) an address or representation of an address of where the contract is stored in the computer-based repository; and/or
   ii) a hash of the contract.

6. A method according to claim 1 and comprising:
   checking whether the contract has been terminated by determining whether the UTXO is in a list of unspent transaction outputs for the blockchain.

7. A method according to claim 1, wherein:
   i) the contract is stored in a Distributed Hash Table (DHT); and/or
   ii) the method comprises:
      broadcasting a transaction to the blockchain comprising an instruction to spend the output at a specified date and/or time, wherein the instruction is a CheckLockTimeVerify instruction.

8. A method according to claim 1 wherein:
   i) access to some or all of the contents of the contract is restricted to at least one designated authorised party; and/or
   ii) the contract comprises a Deterministic Finite Automaton (DFA) to implement the contract;
   wherein the Deterministic Finite Automaton is defined using a codification scheme.

9. A method according to claim 8 wherein the Deterministic Finite Automaton is implemented using:
   i) at least one blockchain transaction, using a scripting language;
   ii) a computing agent arranged to monitor the state of the blockchain; and/or
   iii) a set of instructions for a digital wallet.

10. A system, comprising:
    one or more processors; and
    memory storing instructions that, as a result of execution by the one or more processors, cause the system to:
    (a) store a contract on or in a computer-based repository;
    (b) broadcast a transaction to a blockchain, the transaction comprising:
       i) at least one unspent output (UTXO); and
       ii) metadata comprising an identifier indicative of a location where the contract is stored;
    (c) interpret the contract as open or valid until the unspent output (UTXO) is spent on the blockchain; and
    (d) renew or rolling the contract on by:
       generating a new key using data relating to a previous key associated with the contract;
       generating a script comprising the new key, the location of the contract and a hash of the contract; and
       paying an amount of currency to a transaction comprising the script.

* * * * *